US011153351B2

(12) United States Patent
Kalinin et al.

(10) Patent No.: US 11,153,351 B2
(45) Date of Patent: Oct. 19, 2021

(54) METHOD AND COMPUTING DEVICE FOR IDENTIFYING SUSPICIOUS USERS IN MESSAGE EXCHANGE SYSTEMS

(71) Applicant: TRUST LTD., Moscow (RU)

(72) Inventors: Alexander Sergeevich Kalinin, Elektrostal (RU); Zafar Taxirovich Astanov, Tashkent (UZ)

(73) Assignee: TRUST LTD., Moscow (RU)

( * ) Notice: Subject to any disclaimer, the term of this patent is extended or adjusted under 35 U.S.C. 154(b) by 141 days.

(21) Appl. No.: 16/659,697

(22) Filed: Oct. 22, 2019

(65) Prior Publication Data

US 2020/0195694 A1 Jun. 18, 2020

(30) Foreign Application Priority Data

Dec. 17, 2018 (RU) .................................. 2018144708

(51) Int. Cl.
*H04L 29/06* (2006.01)
*H04L 12/58* (2006.01)

(52) U.S. Cl.
CPC ............ *H04L 63/306* (2013.01); *H04L 51/04* (2013.01); *H04L 63/1408* (2013.01); *H04L 63/1441* (2013.01); *H04L 63/308* (2013.01)

(58) Field of Classification Search
CPC . H04L 63/306; H04L 63/1416; H04L 63/145; H04L 63/1466; H04L 63/1408; H04L 63/1441; H04L 63/308; H04L 51/04
See application file for complete search history.

(56) References Cited

U.S. PATENT DOCUMENTS 7,225,343 B1    5/2007   Honig et al.
7,496,628 B2    2/2009   Arnold et al.
                       (Continued)

FOREIGN PATENT DOCUMENTS

CN    103491205 A    1/2014
CN    104504307 A    4/2015
                 (Continued)

OTHER PUBLICATIONS

Office Action with regard to the counterpart U.S. Appl. No. 15/858,013, filed Nov. 22, 2019.
(Continued)

*Primary Examiner* — Hosuk Song
(74) *Attorney, Agent, or Firm* — BCF LLP

(57) ABSTRACT

A computing device for detecting suspicious users in a plurality of messaging systems and a method for detecting suspicious users therein executable the computing device are proposed. The claimed method includes: receiving a plurality of user messages from a plurality of messaging systems; analyzing each of the received user messages to identify at least one message suspiciousness indicator from a predetermined set of message suspiciousness indicators; if at least one message suspiciousness indicator is detected in the analyzed user message, identifying at least one user associated with the analyzed user message in one of the plurality of messaging systems; assigning each of the identified users a user suspiciousness indicator depending on the identified message suspiciousness indicators; classifying users in the one of the plurality of messaging systems as suspicious their reputation score exceeds a predetermined reputation threshold limit.

19 Claims, 3 Drawing Sheets

(56) References Cited

U.S. PATENT DOCUMENTS

| | | | |
|---|---|---|---|
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,219,549 B2 | 7/2012 | Gao et al. |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Jan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,578,480 B2 * | 11/2013 | Judge ............... H04L 63/1466 726/22 |
| 8,600,993 B1 | 12/2013 | Gupta et al. |
| 8,612,463 B2 | 12/2013 | Brdiczka et al. |
| 8,612,560 B2 * | 12/2013 | Oliver ................ H04L 47/40 709/223 |
| 8,625,033 B1 | 1/2014 | Marwood et al. |
| 8,631,489 B2 | 1/2014 | Antonakakis et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,762,537 B2 * | 6/2014 | Alperovitch ....... H04L 63/1408 709/226 |
| 8,776,229 B1 | 7/2014 | Aziz |
| 8,850,571 B2 | 9/2014 | Stanford et al. |
| 8,856,239 B1 * | 10/2014 | Oliver ............. H04L 29/12132 709/206 |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,100,335 B2 * | 8/2015 | Oliver ............... H04L 61/1552 |
| 9,210,111 B2 | 12/2015 | Chasin et al. |
| 9,215,239 B1 | 12/2015 | Wang et al. |
| 9,253,208 B1 | 2/2016 | Koshelev |
| 9,300,686 B2 | 3/2016 | Pidathala et al. |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,749,336 B1 | 8/2017 | Zhang et al. |
| 9,847,973 B1 * | 12/2017 | Jakobsson ........... H04L 63/0245 |
| 9,888,019 B1 * | 2/2018 | Pidathala .............. G06F 21/566 |
| 9,917,852 B1 | 3/2018 | Xu et al. |
| 9,934,376 B1 | 4/2018 | Ismael |
| 10,129,194 B1 * | 11/2018 | Jakobsson ............. G06F 21/55 |
| 10,715,543 B2 * | 7/2020 | Jakobsson .......... H04L 63/1433 |
| 2002/0161862 A1 | 10/2002 | Horvitz |
| 2003/0009696 A1 | 1/2003 | Bunker et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0095377 A1 | 4/2010 | Krywaniuk |
| 2010/0115620 A1 | 5/2010 | Alme |
| 2010/0115621 A1 | 5/2010 | Stanford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0263264 A1 | 10/2013 | Klein et al. |
| 2013/0297619 A1 | 11/2013 | Ohandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127907 A1 | 5/2016 | Baxley et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0352772 A1 | 12/2016 | O'Connor |
| 2016/0359679 A1 | 12/2016 | Parandehgheibi et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Ohavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0007070 A1 | 1/2018 | Kulkarni et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0268464 A1 | 9/2018 | Li |
| 2018/0307832 A1 | 10/2018 | Ijiro et al. |

(56) References Cited

U.S. PATENT DOCUMENTS

| | | | |
|---|---|---|---|
| 2018/0309787 | A1 | 10/2018 | Evron et al. |
| 2019/0089737 | A1 | 3/2019 | Shayevitz et al. |
| 2019/0207973 | A1 | 7/2019 | Peng |
| 2019/0373005 | A1 | 12/2019 | Bassett |
| 2020/0134702 | A1 | 4/2020 | Li |

FOREIGN PATENT DOCUMENTS

| | | | |
|---|---|---|---|
| CN | 105429956 | A | 3/2016 |
| CN | 105897714 | A | 8/2016 |
| CN | 106131016 | A | 11/2016 |
| CN | 106506435 | A | 3/2017 |
| CN | 106713312 | A | 5/2017 |
| CN | 107392456 | A | 11/2017 |
| EP | 1160646 | A2 | 12/2001 |
| EP | 2410452 | B1 | 1/2016 |
| GB | 2493514 | A | 2/2013 |
| KR | 10-2007-0049514 | A | 5/2007 |
| KR | 10-1514984 | B1 | 4/2015 |
| RU | 2382400 | C2 | 2/2010 |
| RU | 107616 | U1 | 8/2011 |
| RU | 2446459 | C1 | 3/2012 |
| RU | 129279 | U1 | 6/2013 |
| RU | 2487406 | C1 | 7/2013 |
| RU | 2488880 | C1 | 7/2013 |
| RU | 2495486 | C1 | 10/2013 |
| RU | 2522019 | C1 | 7/2014 |
| RU | 2523114 | C2 | 7/2014 |
| RU | 2530210 | C2 | 10/2014 |
| RU | 2536664 | C2 | 12/2014 |
| RU | 2538292 | C1 | 1/2015 |
| RU | 2543564 | C1 | 3/2015 |
| RU | 2566329 | C2 | 10/2015 |
| RU | 2571594 | C2 | 12/2015 |
| RU | 2589310 | C2 | 7/2016 |
| RU | 164629 | U1 | 9/2016 |
| RU | 2607231 | C2 | 1/2017 |
| RU | 2610586 | C2 | 2/2017 |
| RU | 2613535 | C1 | 3/2017 |
| RU | 2622870 | C2 | 6/2017 |
| RU | 2625050 | C1 | 7/2017 |
| RU | 2628192 | C2 | 8/2017 |
| RU | 2636702 | C1 | 11/2017 |
| RU | 2670906 | C9 | 12/2018 |
| RU | 2681699 | C1 | 3/2019 |
| WO | 0245380 | A2 | 6/2002 |
| WO | 2009/026564 | A1 | 2/2009 |
| WO | 2011/045424 | A1 | 4/2011 |
| WO | 2012/015171 | A2 | 2/2012 |
| WO | 2019/010182 | A1 | 1/2019 |

OTHER PUBLICATIONS

Office Action with regard to the counterpart U.S. Appl. No. 16/270,341, filed May 27, 2020.
Office Action received with regard to the counterpart U.S. Appl. No. 15/858,032, filed Apr. 6, 2020.
Notice of Allowance with regard to the counterpart U.S. Appl. No. 15/707,641, filed Oct. 30, 2019.
Whyte, "DNS-based Detection of Scanning Worms in an Enterprise Network", Aug. 2004, NOSS, pp. 1-17 (Year: 2005) in the Notice of Allowance with regard to the counterpart U.S. Appl. No. 15/707,641.
English Abstliact of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, p.p. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Absliact of RU129279 retrieved on Espacenet on Sep. 11, 2017.
English Absliact of RU164629 retrieved on Espacenet on Sep. 11, 2017.
English Absliact of RU2538292 retrieved on Espacenet on Sep. 18, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstiact of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
Notice of Allowance with regard to the counterpart U.S. Appl. No. 15/858,032, filed Jul. 30, 2020.
English Translation of CN106713312, ©Questel—FAMPAT, Jul. 17, 2019.
English Translation of CN105897714, ©Questel—FAMPAT, Jul. 17, 2019.
English Translation of CN106506435, ©Questel—FAMPAT, Jul. 26, 2019.
English Translation of CN107392456, ©Questel—FAMPAT, Jul. 29, 2019.
English Translation of CN103491205, ©Questel—FAMPAT, Jul. 29, 2019.
English Translation of CN106131016, ©Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 15/707,641, filed Apr. 25, 2019.
European Search Report with regard to the counterpart EP Patent Application No. EP17210904 completed May 16, 2018.
Office Action with regard to the counterpart U.S. Appl. No. 16/261,854, filed Oct. 21, 2019.
Notice of Allowance with regard to the counterpart U.S. Appl. No. 15/858,013, filed May 8, 2020.

(56) References Cited

OTHER PUBLICATIONS

Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Absliact for CN104504307 retrieved on Espacenet on Jan. 7, 2020.
Notice of Allowance with regard to the counterpart U.S. Appl. No. 15/858,013, filed Jun. 10, 2020.
Office Action with regard to the counterpart U.S. Appl. No. 16/247,870, filed Jun. 29, 2021.

* cited by examiner

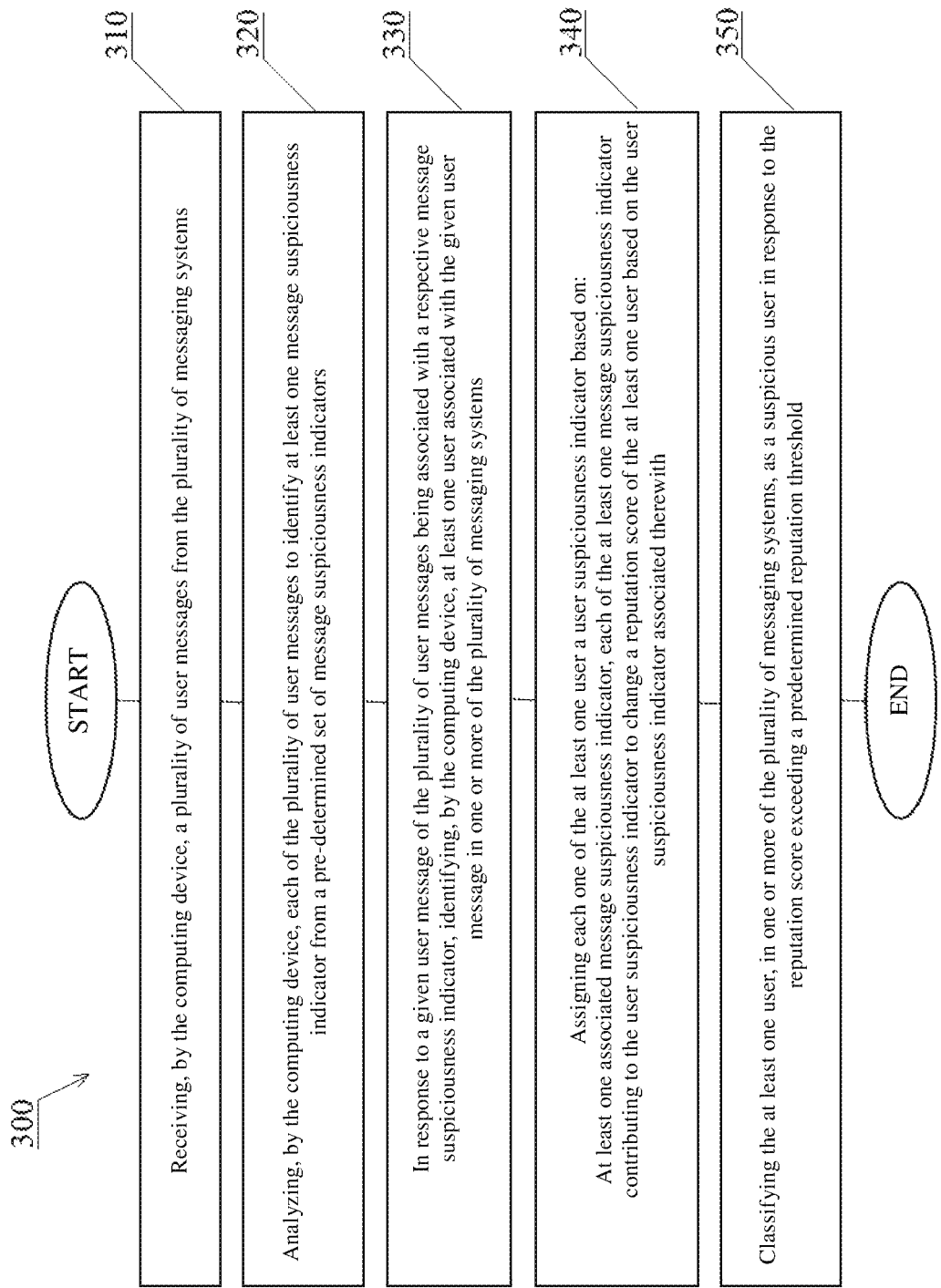

METHOD AND COMPUTING DEVICE FOR IDENTIFYING SUSPICIOUS USERS IN MESSAGE EXCHANGE SYSTEMS

CROSS-REFERENCE

The present application claims priority to Russian Patent Application No. 2018144708, entitled "METHOD AND COMPUTING DEVICE FOR IDENTIFYING SUSPICIOUS USERS IN MESSAGE EXCHANGE SYSTEMS" (as translated from Russian-language title appearing on the application as filed with the Russian Patent Office: " СПОСОБ И ВЫЧИСЛИТЕЛЬНОЕ УСТРОЙСТВО ДЛЯ ВЫЯВЛЕНИЯ ПОДОЗРИТЕЛЬНЫХ ПОЛЬЗОВАТЕЛЕЙ В СИСТЕМАХ ОБМЕНА СООБЩЕНИЯМИ"), filed on Dec. 17, 2018, the entirety of which is incorporated herein by reference.

FIELD

The present technology relates to the field of information security, and in particular, to a method and a computing device for identifying suspicious users in messaging systems.

BACKGROUND

Nowadays, the most popular means of communication on the Internet, corporate and local networks are various instant messaging systems (also called instant messengers or IMS systems), which allow users to organize a real-time or near-real-time message exchange, using any user computing device, such as a desktop computer, laptop, netbook, tablet, communicator, cell phone, smartphone, etc., on which the necessary client software (also called IM-client) is installed and which has configured to connect to the appropriate information network. The most popular messengers in the world are, in particular, Viber™ messaging system, WhatsApp™ messaging system, Facebook Messenger™ messaging system, Telegram™ messaging system, Slack™ messaging system, Skype™ messaging system, Signal™ messaging system, ICQ™ messaging system, VideoChat™ messaging system and other popular messengers. In addition, offline communication systems are still popular communication tools, examples of which are electronic mail systems, forums, guest books on a standalone-web resource, Internet blogs, etc.

It shall be noted that each of the above messengers usually has separate servers and protocols, and also differ from other messengers by rules and features, wherein there is no direct connection between different messengers, which, however, does not prevent any user from simultaneously using several different instant messengers for communication purposes.

Malicious users often use these popular instant messengers to send victim users messages comprising information about fake email addresses, fake account information in financial institutions or payment systems and/or malicious links that allow malicious users to deliver files with malicious content to the computing devices of the victim users, to install malicious software on the computers of the victims users, to redirect victim users to a fake website, etc. in order to further carry out various malicious activities, such as spamming, cyber blackmail, phishing, anonymous access to the network, theft of confidential data, etc., depending on the goals of these malicious users.

In order to identify and block malicious users based on the results of the analysis of their messages sent to instant messengers, the so-called intelligent chat bots embedded in such instant messengers or connected to them are widely used.

One of the illustrative examples of such an intelligent chat bot is described in Russian Patent No. RU2670906 C1 (published on Oct. 25, 2018; H04L 29/00) that describes a self-adjusting interactive message and/or call exchange system between users of different websites using client-server technology, comprising: an access module that provides the user access to the specified system if it is successfully authenticated by at least one social network and/or email authentication; a user device associated with the access module and configured to provide navigation to at least one website, enter messages and/or make calls designed for users of the websites; a user profile reliability assessment module associated with a user device and adapted to calculate a user rating reflecting the level of trust in messages that users exchange; a message and/or call exchange module between users of at least one web site associated with a user profile reliability assessment module and configured to exchange messages and/or calls between the users of at least one web site associated with a user profile reliability assessment module and configured to organize the exchange of messages and/or calls in a group of users depending at least on the user's rating and the possibility of automatic blocking of the possibility of exchanging personal and/or group messages and/or calls for at least one user depending at least on the user's rating; a data protection module that checks any content which users exchange using a messaging module and configured to check comments and data messages for their belonging to the data sent by bots, by estimating the frequency of the user sending comments and/or messages based on the IP address of these users to ensure users are blocked if the frequency of sending messages and/or comments exceeds a specified threshold for a given period of time, and configured to perform an anti-virus check of content in the said system.

It shall be noted that the protection module of the messenger users from the actions of intruders in the messaging system and/or calls between users, described in the patent RU 2670906, uses an extremely limited set of tools to detect and block suspicious users, and also allows identifying malicious users only within a single messenger, that is, does not use any means or mechanisms to identify possible accomplices of these malicious users who may carry out similar malicious activities, not only in other messengers, but also in the same messenger.

Thus, there is an obvious need for further improvement of protection against targeted attacks, for the organization of which the attackers use messages with malicious content sent to the users, for example, in various instant messengers, in particular, to more effectively detect malicious users in instant messengers and groups of interconnected malicious users who perform their malicious actions in the same instant messenger or in several different instant messengers.

Consequently, the technical problem solved by this technique is to create improved means for detecting suspicious users in the messengers, in which the above-mentioned disadvantage of known remedies is at least partially eliminated, which consists in the low effectiveness of identifying malicious users in messengers and in the impossibility of identifying a group of intruders carrying out similar malicious activities both in the same messenger and in several different instant messengers.

SUMMARY

In accordance with one broad aspect of the present technology, there is provided a method for detecting suspicious users in a plurality of messaging systems. The method is executable by a computing device. The method comprises: receiving, by the computing device, a plurality of user messages from the plurality of messaging systems, analyzing, by the computing device, each of the plurality of user messages to identify at least one message suspiciousness indicator from a pre-determined set of message suspiciousness indicators, in response to a given user message of the plurality of user messages being associated with a respective message suspiciousness indicator: identifying, by the computing device, at least one user associated with the given user message in one or more of the plurality of messaging systems, assigning each one of the at least one user a user suspiciousness indicator based on: at least one associated message suspiciousness indicator, each of the at least one message suspiciousness indicator contributing to the user suspiciousness indicator to change a reputation score of the at least one user based on the user suspiciousness indicator associated therewith, classifying the at least one user, in one or more of the plurality of messaging systems, as a suspicious user in response to the reputation score exceeding a predetermined reputation threshold.

In some implementations of the method, the method further comprises identifying a format of the plurality of user messages, and in response to the format of a given one of the plurality of user messages not matching a pre-determined data format suitable for the computing device, converting the given one of the plurality of user messages into the pre-determined data format.

In some implementations of the method, the method further comprises (i) detecting at least one of a voice message and a video message in the plurality of user messages and (ii) converting the at least one of the voice message and the video message into text.

In some implementations of the method, the analyzing the plurality of user messages comprises executing at least one of: detecting an indication of at least one malicious link, detecting an indication of at least one malicious payment system account, detecting an indication of at least one malicious email address, detecting an indication of at least one malicious account of a financial institution.

In some implementations of the method, the detecting the indication of at least one malicious link comprises extracting at least one network address from an analyzed user message and: analyzing a domain name of the at least one network address for maliciousness using at least one analysis technique, obtaining at least one file located at the at least one network address and analyzing the at least one file for maliciousness using at least one analysis technique, and receiving html-code of a web resource located at the at least one network address and analyzing the html-code for maliciousness using at least one analysis technique.

In some implementations of the method, the method further comprises determining whether the at least one network address matches, at least partially, with one of known malicious links.

In some implementations of the method, the analyzing the domain name for maliciousness comprises determining whether the domain name matches, at least partially, with one of known malicious domain names.

In some implementations of the method, the analyzing the at least one obtained file comprises determining a hash sum and determining if the hash sum matches with the hash sum of one of known malicious files.

In some implementations of the method, the analyzing the html-code comprises executing a search in the html-code for pre-determined keywords indicating malicious nature of the web resource.

In some implementations of the method, the detecting the indication of the at least one malicious payment system account comprises extracting at least one payment system account from the analyzed user message and determining if the payment system account matches with one of known malicious payment system accounts.

In some implementations of the method, the detecting at least one malicious email address comprises extracting at least one email address from the analyzed user message and determining if the email address matches with one of known malicious email addresses.

In some implementations of the method, the method further comprises analyzing identification data of the at least one user in order to identify at least one user suspiciousness indicator from a pre-determined set of user suspiciousness indicators, such that an additional user suspiciousness indicator assigned to each of the at least one user, based on message suspiciousness indicators of messages having been sent by the at least one user.

In some implementations of the method, the analyzing the identification data of the at least one user is executed for only those ones of the at least one user that are associated with the reputation score that exceeds a second predetermined reputation threshold, which is lower than the predetermined reputation threshold.

In some implementations of the method, the analyzing the identification data of the at least one user comprises: determining whether at least one of: profile picture, a full name and a nickname of the at least one user matches a corresponding one of an administrator in at least one of the plurality of messaging systems, determining whether the at least one user is a program that simulates behavior of a human user in the plurality of messaging systems, determining whether an other at least one user invited by the at least one user to exchange messages within at least one message exchange channel of the plurality of messaging systems is a program that simulates the behavior of a human user, and determining whether there is an other at least one user in the plurality of messaging systems with identification data that matches the identification data of the at least one user.

In some implementations of the method, the identifying whether the at least one user is the program that simulates the behavior of a human user comprises analyzing sending messages activity of the at least one user for a pre-determined period of time, and in response to determining that the sending messages activity corresponds to a pre-determined timing scheme, the method further comprises classifying the at least one user as the program that simulates the behavior of a human user.

In some implementations of the method, the identifying the at least one user further comprises analyzing messages that are similar to a suspicious user message of the at least one user, such that to cluster, into a user cluster, all users having sent similar, to the suspicious user message, and in response to any one of the users of the user cluster being classified as a suspicious user, classifying all the users of the user cluster as suspicious users.

In some implementations of the method, the identifying the at least one user further comprises analyzing users that have similar identification data, such that to cluster, into a user cluster, all users with similar identification data; and in response to any one of the users of the cluster being classified as a suspicious user, classifying all the users of the user cluster as suspicious users.

In some implementations of the method, the identifying the at least one user further comprises extracting a link from at least one user message associated with the at least one user; and wherein the method further comprises creating a user cluster based on the users having sent the link as part of their user messages; and in response to any one of the users of the user cluster being classified as a suspicious user, classifying all the users of the user cluster as suspicious users In some implementations of the method, the method further comprises determining whether the link is the same based on at least one of: whether domain names have a similar spelling; whether domain names are registered to a same person, whether same personal data is specified for registered domain names; whether domain names are located at a same IP address and whether the links have a same United Resource Locator (URL).

In accordance with another broad aspect of the present technology, there is provided a computing device for detecting suspicious users in a plurality of messaging systems, configured to communicate with messaging systems, the computing device comprising: a non-transitory memory for storing machine-readable instructions; a computing processor configured to execute the machine-readable instructions, which instructions when executed are configured to render the computing device operable to execute the above-described method.

In accordance with yet another broad aspect of the present technology, there is provided a method for identifying suspicious users in messaging systems is claimed, performed on a computing device, and according to this method: receiving multiple user messages from at least one messaging system; analyzing each of the received user messages to identify at least one sign of suspiciousness of a message from a given set of signs of suspiciousness of messages; if at least one sign of suspiciousness of the message in the analyzed user message, identifying at least one user, associated with the analyzed user message, in the specified messaging systems; assigning each of the identified users an assessment of suspiciousness depending on the identified signs of suspiciousness of the message, each contributing to the assigned assessment of suspiciousness, ensuring the change in the reputation indicator of the specified user based on the assigned assessment of suspiciousness; attributing users under at least one of the specified messaging systems to suspicious users in the event of the changed value of their reputation score exceeds a predetermined limit of reputation threshold.

In one of the embodiments of this technique, the claimed method may include an additional operation, wherein the description format of the received user messages is identified, if the identified message description format does not conform to the unified data description format suitable for computing devices, then the received messages will be converted into the specified unified format.

In another embodiment of this technique, the claimed method may include an additional operation, wherein voice messages and videos are detected in said received user messages and converted into text.

In some embodiments of this technique, when analyzing each of the received user messages in the claimed method, at least one of the following sub-steps is performed, wherein: at least one malicious link is detected in the analyzed user message; in the analyzed user message at least one malicious account of the payment system is detected; in the analyzed user message at least one malicious email address is detected; in the analyzed user message information about at least one malicious account in a financial organization is revealed.

In other embodiments of this technique, if at least one malicious link is detected in the analyzed user message in the claimed method, at least one link is extracted from the analyzed user message, ensuring at least one of the following operations, wherein: the domain name is analyzed for the extracted references for maliciousness using at least one analysis technique; at least one file located on the extracted link is obtained, followed by its analysis for maliciousness using at least one analysis method; and the html-code of the web resource located on the extracted link is received, followed by its analysis for maliciousness using at least one analysis technique.

In some other embodiments of this technique, when detecting at least one malicious link in the analyzed user message in the claimed method, it is further established whether the extracted link coincides at least partially with one of the known malicious links.

In other embodiments of this technique, when analyzing a domain name for maliciousness, it is additionally checked whether the analyzed domain name coincides at least partially with one of the known malicious domain names.

In some other embodiments of this technique, when analyzing the file obtained by the extracted reference, the hash sum is additionally calculated for maliciousness and it is determined whether the calculated hash sum of the analyzed file matches the hash sum of one of the known malicious files.

In one of the embodiments of this technique, when analyzing the obtained html-code of a web resource, search is conducted in the specified html-code for specified keywords indicating the harmful nature of the web resource.

In another embodiment of this technique, the sub-step of detecting at least one malicious payment system account in the analyzed user message includes extracting from the analyzed user message at least one payment system account with the provision of verification, whether the extracted payment system account matches one of the known malicious payment system accounts.

In yet another embodiment of this technique, the sub-step of detecting at least one malicious email address in the analyzed user message involves extracting at least one email address from the analyzed user message, ensuring that the extracted email address matches one of the known malicious e-mail addresses.

In some other embodiment of this technique, the identification data of the identified users is additionally analyzed in order to detect at least one sign of user suspicion from a given set of signs of user suspicion with the provision of allocation of an additional assessment of suspicion to each of the indicated users identified depending on the detected signs of suspicion of the message, each making its own assigned contribution to the assigned additional assessment of suspicion, with the provision of changes in the specified user's reputation based on the assigned additional suspicion rating.

According to one of the embodiments of this technique, additional analysis of user identification data is carried out with respect to only those identified users whose reputation exceeds the specified minimum reputation threshold, which is less than the specified limit of reputation threshold.

According to another embodiment of this technique, when identifying at least one suspiciousness sign of each of the identified users: it is determined whether the profile picture, full name and/or nickname of the identified user match the corresponding information about the administrator in at least one of the messaging systems; it is detected whether the identified user is a program that imitates the user's behavior in the corresponding messaging system; it is detected whether the persons invited by the identified user to exchange messages within at least one message exchange channel in the corresponding messaging system are a program that simulates a person's messaging activity in the specified messaging system, and/or it is identified whether there is in any messaging systems at least one user with credentials matching the credentials of the identified user.

According to another embodiment of this technique, when identifying whether the identified user is a program that simulates the user's behavior in the corresponding messaging system, the activity of sending messages by the specified user is analyzed in the specified messaging system for a specified period of time, wherein if detecting that the activity of sending messages of the user corresponds to a certain time scheme, the specified user is classified as one of the programs simulating user behavior.

According to some other embodiment of this technique, when identifying at least one user associated with a suspicious user message in messaging systems, messages that are similar to the specified suspicious user message are detected in these messaging systems, ensuring the association of users who sent such similar messages to a group of related users, in this case, when the reputation indicator of at least one of the users in the specified group exceeds the specified limit of reputation threshold, all users from the specified group are classified as suspicious users.

According to yet another embodiment of this technique, when identifying at least one user associated with a suspicious user message in messaging systems, users with similar identification data are detected in these messaging systems by ensuring that such users are combined into a group of related users; wherein if the reputation indicator of at least one of the users in the specified group exceeds the specified limit of reputation threshold, all users from this group are classified as suspicious users.

According to other embodiments of this technique, when identifying at least one user associated with a suspicious user message in messaging systems, a possible link is established between the references extracted from the messages being analyzed in messaging systems with other references extracted from the messages being analyzed in these messaging systems, with the provision of the integration of such users into a group of interconnected users when establishing such communication, and wherein if the reputation indicator of one of the users in the specified group exceeds a predetermined limit of reputation threshold, all users from this group are classified as suspicious users.

According to some embodiments of this technique, when establishing a connection between references extracted from analyzed messages in messaging systems, at least one of the following is established for each pair of references: whether the domain names have a similar spelling; whether the domain names are registered to the same person; whether the same contact information is provided for registered domain names; whether the domain names are located at the same IP address; and whether the extracted references have the same single web resource index ("URL", for example, https://ru.wikipedia.org/wiki/URL).

According to some other embodiments of this technique, the claimed method further sends information about each of the suspicious users to the appropriate messaging system.

In one of the embodiments of this technique in the claimed method, an additional request is sent to block each of the suspicious users to the corresponding data exchange system.

In another embodiment of this technique, in the claimed method, the analyzed user messages are additionally stored in the database of user messages located on the computing device.

In another embodiment of this technique, in the claimed method, for at least one of the stored user messages, a request is sent to the appropriate messaging system associated with the specified stored user message to establish whether the user has changed the user message in the specified messaging system, wherein if it is established that a user message has changed, the specified user message is received from the specified messaging system with provision of its re-analysis for signs of suspicion.

In some other embodiments of this technique, the request is sent to the messaging system for at least one stored user message associated with a user whose reputation has exceeded the minimum reputation threshold.

In some embodiments of this technique, the access to at least one of the stored user messages is received, via a computing device, to the corresponding messaging system, ensuring that a user message is retrieved from its message database, the attributes of which match the attributes of the specified user message, and the hash sum is calculate of the specified saved user message and the extracted user message, in this case in the event of a mismatch of the calculated hash-sums, the repeated analysis of the specified modified user message is carried out for signs of suspicion.

In other embodiments of this technique, access to the message database of the messaging system, extracting the necessary user message from it, is obtained for at least one saved user message associated with a user whose reputation has exceeded the minimum reputation threshold.

In some embodiments of this technique, in the claimed method, identified suspicious users in the respective data exchange systems are additionally blocked by means of a computing device.

The said technical problem is also solved in another aspect of this technique, wherein a computing device for detecting suspicious users in messaging systems is claimed, which is capable of communicating with messaging systems and comprises a memory for storing machine-readable instructions and at least one computing processor configured to execute machine-readable instructions with the implementation of the above described method of detecting suspicious users in messaging systems.

a. The objectives and advantages of the claimed method and computing device for identifying suspicious users in messaging systems will be apparent from the description below, attached drawings and the appended claims.

BRIEF DESCRIPTION OF THE DRAWINGS

Accompanying drawings are provided for a better understanding of the non-limiting embodiments of the present technology.

FIG. 3 depicts a flowchart diagram of a method for detecting suspicious users in messaging systems, according to the non-limiting embodiments of the present technology.

DETAILED DESCRIPTION

Figure 1:
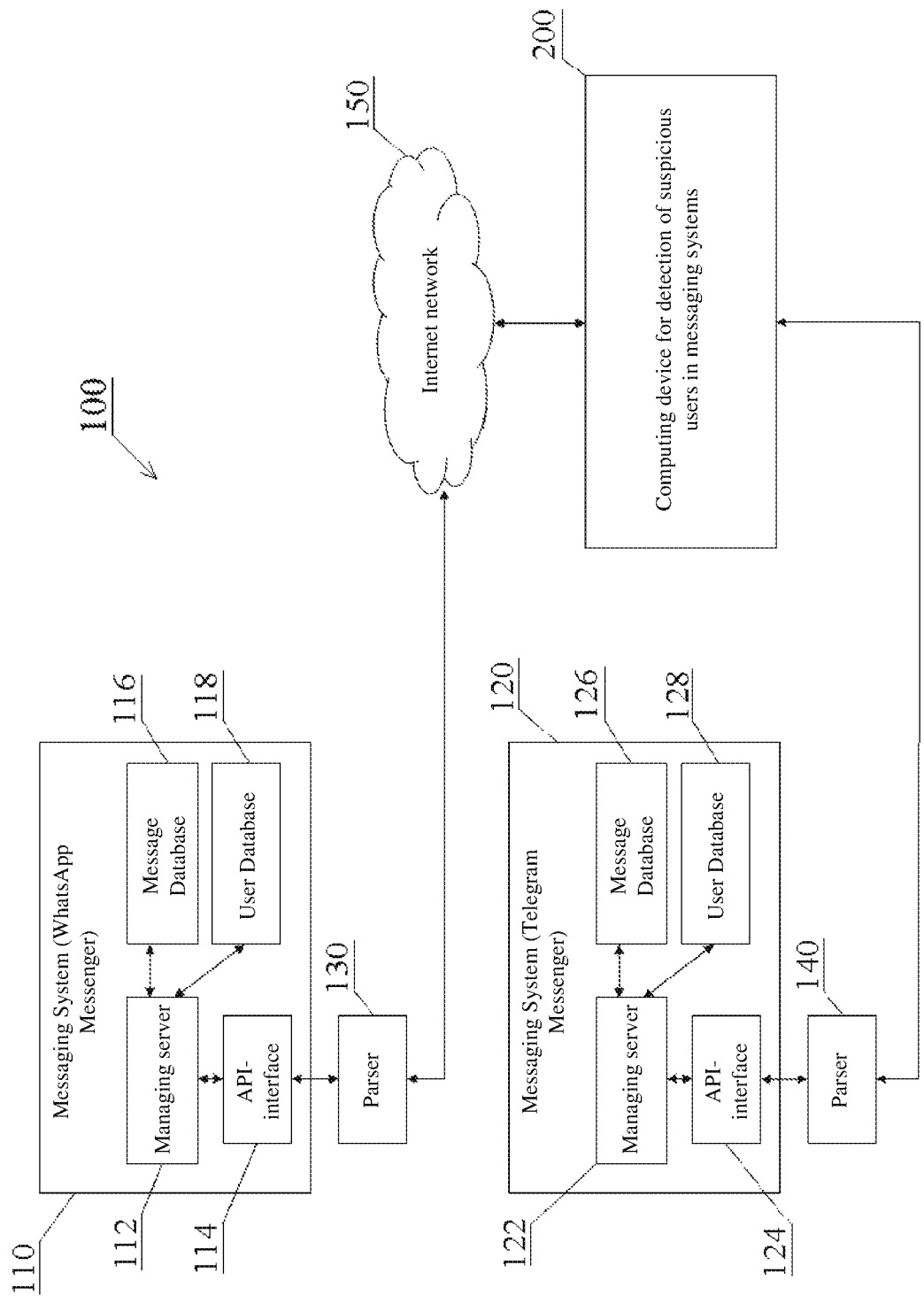
FIG. 1 schematically depicts a system for detecting suspicious users in messaging systems, according to the non-limiting embodiments of the present technology.

Some non-limiting examples embodiments of the present technology are described below, and it should be expressly understood that the following description is not intended to be limitative.

Messaging systems (also referred to herein as "messengers") are usually implemented on the basis of a central computer or a control server, which, inter alia, is connected to a message database and a user database with the provision of managing the update of these databases and controlling access to these databases. Depending on the specific implementation of the messaging system, its users can send and/or receive text messages, voice messages, images and video.

In order to start working in any messaging system, the user needs to install an IM client on his device and to receive an identifier that is unique within a particular messaging system. In messaging systems that require an account, depending on their implementation, a login is used as a unique identifier, which can be an email address (e-mail), a set of numbers and/or characters (a nickname), an integer (for example, "UIN" in the ICQ™ messenger or "user_id" in the Telegram™ messenger) or any combination thereof. In the same messaging systems that do not require such an account (for example, blogs that allow anonymous commenting of published user posts), an IP address of the user's device can be used as the unique user ID, a unique user "fingerprint", such as "user agent", a MAC address of the user's device, an "IMEI" number of a mobile device associated with the user, etc.

Each messaging system has one or more messaging channels (also, referred to herein as "chats") used by users to exchange messages with each other.

The messaging channel in various messaging systems may include the following:

web chat running on a standalone web resource, for example, on the chat.ru web resource;

a separate, so-called channel of "Telegram" messenger, available on both mobile devices and personal computers;

text dialogue of at least two users in instant messengers such as ICQ™ messaging system, Skype™ messaging system, WhatsApp™ messaging system, etc., available both on mobile devices and on personal computers;

voice dialogue (accompanied by video or without it) in messengers like Skype™ messaging system, WhatsApp™ messaging system, etc.;

exchange of images, text and/or video in the system of virtual or augmented reality in instant messengers like VideoChat™ messaging system, in which each of the interlocutors must use special equipment, for example, VR helmets or VR glasses;

any other text messaging channel used on the Internet, equipped with its own API-interface, for example, e-mail, a forum or a guest book on a standalone web resource, comments to a blog entry, etc.

Each messaging system has its own external connection interface (API), through which any external device that is connected to a specified API and knows the syntax of its commands can interact with the control server on the basis of which this particular messaging system is implemented, for sending to this control server, for example, requests to perform, by the control server, control actions and/or requests to send the entire message flow to a specified external device from all users through all messaging channels within that particular messaging system, including all additional information that attributes such user messages. Thus, an API of each messaging system is bidirectional, that is, it allows not only for transferring requests from external devices to the control server, but also for transferring necessary information from the control server to the external devices in response to requests received therefrom.

The user message transmitted via any of the above-mentioned channels in a messaging system, each having its own unique logical address under which it can be accessed, includes two main parts: a message body, which represents content (text, images, sound recordings, videos, files, etc.) that one user intends to transfer to another user within the established messaging channel in the messaging system, and a message header, which comprises information used by the messaging system to describe the transmitted user message, including the date and time when it was sent, the sender's identification data, the recipient's identification data, the messaging system identification data, text attributes such as font, size, leading, etc. Thus, all user messages have the same structure: the body of each user message comprises data (content) that must be transmitted in accordance with the information placed in the header of the user message.

Terminology

In the context of this document, unless expressly stated otherwise, the "reputation indicator" is a number, such as an integer, and this number is one of the required fields of a database or databases in which user data is stored, in particular, of a local data storage described below. When a new record associated with a new user is created in such a database or databases, the reputation indicator of this new user is assigned thereto as a predetermined numerical value, for example, a zero value. In case of detection of malicious content, for example, a malicious link, in a message sent by a specific user in the messaging system, the value of this user's reputation indicator is changed, in particular, the value of this user's reputation indicator is increased by the value calculated by a method described below, preserving in the corresponding database or databases the specified changed value of the reputation indicator.

In the context of this document, unless expressly stated otherwise, the "minimum reputation threshold" is value of the reputation indicator associated with a given user, by exceeding which the given user is considered potentially suspicious (i.e., one of users suspected of spreading malicious messages in messaging systems) for which the additional checks described below can be carried out, the negative results of which can lead to increase of reputation indicator of the given user.

In the context of this document, unless expressly stated otherwise, the "limit reputation threshold" is a value of the reputation indicator associated with the given user, by exceeding which the given user is considered one of suspicious users, that is, one of users who spread malicious messages in messaging systems, which may result, in the non-limiting embodiments of the present technology, at least in temporarily blocking the given user in at least one of the messaging systems.

System for Identifying Suspicious Users in Messaging Systems

Figure 2:
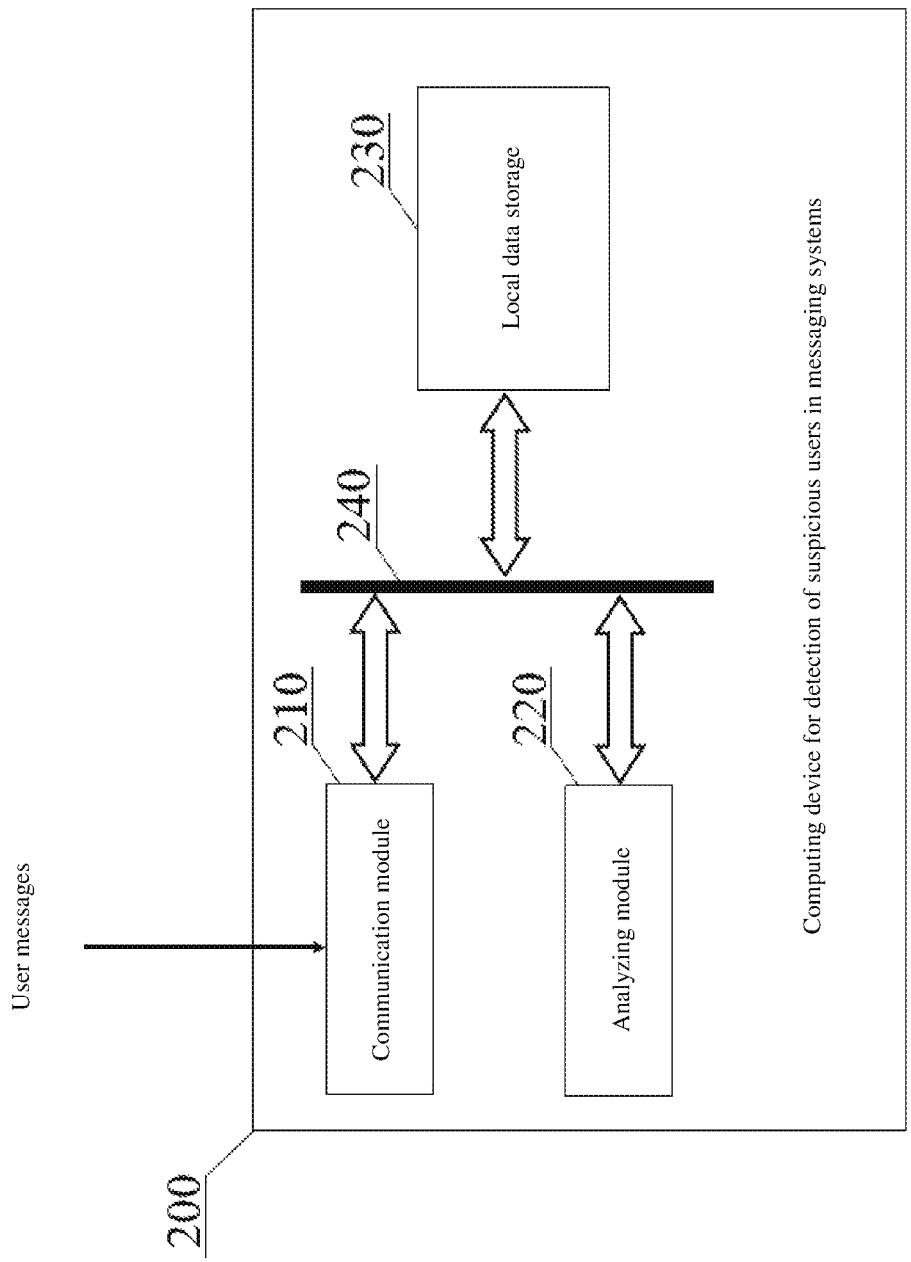
FIG. 2 depicts a functional diagram of a computing device of the system of FIG. 1, according to the non-limiting embodiments of the present technology.

FIG. 1 schematically depicts a system 100 configured for identifying suspicious users in messaging systems, according to the non-limiting embodiments of the present technology, comprising a messaging system 110 that can be, for example, represented by the WhatsApp™ messenger; a messaging system 120 that can be, for example, represented by the Telegram™ messenger; and a computing device 200 depicted in FIG. 2. The messaging system 110 includes, inter alia, a control server 112, an API-interface 114 that is configured to interact with the control server 112, a message database 116 and a user database 118 run by the control server 112; all messages transmitted by the users in the messaging system 110 are stored in the message database 116, and all users who use the messaging system 110 to communicate with other users of this messaging system 110 are stored in the user database 118. The messaging system 120 also includes, inter alia, a control server 122, an API-interface 124 that is configured to interact with the control server 122, a message database 126 and a user database 128 managed by the control server 122, wherein all messages transmitted by the users in the messaging system 120 are stored in the message database 126, and the information on all users who use the messaging system 120 for communication with other users of this messaging system 120 is stored in the user database 128. According to the non-limiting embodiments of the present technology, each user message in the message database 116 and in the message database 126 are assigned with at least one unique identifier corresponding to one of the users; and information about users in the user database 118 and in the user database 128 is also associated with at least unique identifier of one of the users. In addition, each of the messaging systems 110, 120 may additionally comprise its own database of suspicious users (not depicted).

Thus, according to the non-limiting embodiments of the present technology, system 100 depicted in FIG. 1 is designed to detect suspicious users in the messaging system 110 and the messaging system 120.

The computing device 200 configured for identifying suspicious users, according to the non-limiting embodiments of the present technology, is connected to the messaging system 110 and the messaging system 120 via a parser 130 that is connected to the API-interface 114 of the messaging system 110 and is preconfigured to work with it, and a parser 140 connected to the API-interface 124 of the messaging system 120 and preconfigured to work with it, wherein the parser 130 is configured to exchange messages with the computing device 200 using an Internet network 150, and the parser 140 is wire-based connected with the computing device 200. It shall be noted that each of the API-interface 114 and the API-interface 124 has its own specific command syntax, so the parser 130, working with the API-interface 114, has been preprogrammed to understand the command syntax of this API-interface 114, and the parser 140, working with API-interface 124, has been pre-programmed to understand the syntax of the API-interface 124 commands in the same way, wherein setting of the parser 130 and the parser 140 to work respectively with the API-interface 114 and the API-interface 124 is carried out when an initial connection of the computing unit 200 to the messages exchange systems 110, 120 is established.

The computing device 200 is configured to send requests to each of the messaging system 110 and the messaging system 120 using the parsers 130, 140 that are preconfigured to work with the API-interfaces 114, 124, respectively, through which the directed requests are received in the messaging systems 110, 120, these requests comprise commands that are understood respectively by the control servers 112, 122, after which the control servers 112, 122 will be able to properly handle the specified received requests and adequately respond to them.

It shall be noted that the messaging system 110 and the messaging system 120 depicted in FIG. 1 solely as an example and are not intended to be limitative, it shall be clear to those skilled in the art that the system 100 can comprise both a single messaging system represented, for example, by any one of known messengers, and more than two messaging systems, each being represented, for example, by any one of known messengers, and an interaction between any such messaging systems and the computing device 200 is to be occurred as described below, based on example interaction processes between the computing device 200 and the messaging systems 110, 120.

Any of the parsers, including the parsers 130, 140 used in system 100 for identifying suspicious users, can be connected to the computing device 200 indirectly, that is, using a wired or wireless connection, for example, using the Internet network 150, and directly, that is, without using, for example, the Internet network 150.

In the non-limiting embodiments of the present technology, the computing device 200 is configured to send requests to each of the messaging system 110 and the messaging system 120 to receive user messages therefrom sent by users through all messaging channels within a respective messaging system, wherein in response to accepted requests, the control servers 112, 122 configured to have access to the messages database 116 and the messages database 126, respectively, for extracting the requested user messages therefrom and sending the extracted user messages, respectively, through the API-interfaces 114, 124 to the parsers 130, 140, wherein the parser 130 is configured to process an output data stream from the API-interface 114 to extract user messages therefrom, requested from the messaging system 110; and the parser 140 is configured to process an output data stream from the API-interface 124 to extract user messages therefrom requested by the messaging system 120.

In particular, in the non-limiting embodiments of the present technology, the output data stream from any API-interface comprises a text of the user message and the identification data describing the user messages, for example, the date and time of sending, the sender's identification data, the recipient's identification data, the messaging system identification data and/or other necessary attributes of these transmitted messages. The output data stream from any API-interface usually represents a character string with a specified description format, dividing the output data stream into structural elements, using, for example, a predefined symbol, such as the "#" character (hash symbol), wherein the description format of such a character string from the API-interface of a particular messaging system shall be known to a respective parser, which is configured to work with this API-interface. As an example, the output data stream from the API-interface can be a character string of the following form: . . . message_id: ide736353672383#from: @user1#date: 11.10.2018 15:155#text: Hello world. https://phishingwebsite.com/login#. Upon receipt of such character strings from one of the API-interfaces 114, 124, the parsers 130, 140, respectively, extract from these received strings, each divided into a known set of structural elements, the user message text, and at least some of the above described identification data describing these user messages, further transferring that identification data to the computing device 200 for further processing, the features of which are described below. For the above example of a character string that can be retrieved by any of the parsers 130, 140 from the corresponding API-interface, the text of the user message that will be retrieved by the respective parser will look, for example, as follows: "Hello world. https://phishingwebsite.com/login", wherein in the respective parser the extracted text "Hello world. https://phishingwebsite.com/login" will be associated with at least some of the extracted identification data describing this user message, and transmitted to the computing device 200. In particular, it shall also be noted that in order to correctly extract all necessary information, such as the text of the user message and identification data describing the user message, from the output data streams from API-interfaces 114, 124, the parsers 130, 140, respectively, shall be preprogrammed or configured to be able to process the output data streams, presented in a form of character strings, respectively, from the API-interfaces 114, 124, wherein each of the parsers 130, 140 shall at least know recording format of the processed data streams. In particular, for the example above, the parsers 130, 140 shall at least be configured to recognize that the keyword in the received character string of the beginning of the text of the user message is the word "text". It shall also be noted that in order to process the output data stream from the corresponding API-interface in the parser, it could additionally (in addition to the extracted text of the user message, as described earlier in this document) retrieve all the necessary identification data describing the extracted user message, for example, date and time of sending, identification data of the sender, identification data of the recipient, identification data of the messaging system itself and/or other identifiers (that is, all the information that is usually comprised in the headers of user messages transmitted within a particular messaging system, and which allows to describe the body of these user messages), the specified parser shall also be configured to recognize other standard keywords commonly used in the received character strings to indicate the presence of certain identifying information following this keyword in these character strings.

In some non-limiting embodiments of the present technology, each of the parsers 130, 140 may be further programmed or configured to recognize or identify the description format of the output data stream from API-interfaces 114, 124, respectively. In addition, each of the parsers 130, 140 is pre-programmed in such a way that it knows the unified data description format with which the computing device 200 operates, wherein the text format of data description is used as the unified format. In these embodiments, the system 100 may further comprise a conversion module (not depicted) connected to the parser 130, and another conversion module (not depicted) connected to the parser 140, each of these converting modules are configured to convert voice/sound into text (for example, using temporal dynamic algorithms, methods of context-dependent classification based on the extraction from the speech of individual lexical elements, such as phonemes and allophones, with their subsequent integration into syllables and morphemes, methods of discriminant analysis based on Bayesian discrimination, methods based on hidden Markov models, methods based on neural networks, etc.), converting a video/video stream into text (for example, using the Virtual Audio Cable™ software product), configured to recognize text in a video/video stream, such as a subtitle in (for example, using the ABBY™ Real-time Recognition SDK™ software), configured to recognize objects in a video/video-stream convert them into text (for example, using the cloud service Cloud Video Intelligence IP™) and/or configured to recognize actions in a video/video-stream to convert them into text (for example, using the same cloud service Cloud Video Intelligence IP™).

In some non-limiting embodiments of the present technology, at least each of the conversion modules may comprise several conversion submodules, each being configured to implement at least one of the above-described functionalities. In other non-limiting embodiments of the present technology, each of the conversion modules can be divided into several separate modules, each being configured to implement at least one of the above-described functionalities. In case where one of the parsers 130, 140 has determined that the output data stream from the corresponding API-interface is described using a format different from the unified data description format suitable for the computing device 200, the respective parser transmits this output data stream to the corresponding external conversion module for converting it from the identified format to the specified unified data description format using at least one conversion method described above, for using which that conversion module has been pre-programmed, wherein the selection of the conversion method depends on the identified data description format. Thus, if one of the parsers 130, 140 has determined that the output data stream from the corresponding API-interface is essentially a voice/audio message and/or video/video stream, that parser sends them to the corresponding conversion module to convert those voice/audio message and/or video/video stream into text. Further, the parser, which has determined the difference between the format of the description of the output data stream of the API-interface and the unified format of data description, receives the text extracted by the corresponding conversion module (in this case such extracted text received from the conversion module is essentially a text message), and starts the above process of extracting structural elements therefrom. In case where one of the parsers 130, 140 has determined that the output data stream from the corresponding API-interface is described using a format that matches the unified data description format, that is, it is presented in a textual data description format, this parser immediately starts to execute the above process of extracting structural elements therefrom.

In some non-limiting embodiments of the present technology, the system 100 may further comprise a separate user message database (not depicted) that is external to the computing device 200 to identify suspicious users, and the parsers 130, 140 can be configured to access this external user message database with a possibility of recording information therein extracted from the output data streams from the API-interfaces 114, 124, respectively, which results in this external user message database comprising user text messages associated with supporting identification data describing these user messages, such as the date and time the user message was sent, the sender ID, the recipient ID, the messaging system ID, and/or at least one other identifier. The computing device 200 is configured to have access to this external user message database with the possibility of extracting necessary information therefrom for further processing, the features of which are described below.

In other non-limiting embodiments of the present technology, the system 100 may further comprise only the computing device 200 for identifying suspicious users and the external user messages database. In these embodiments, the external user message database comprises the user message text associated with supporting identification data describing these user messages, for example, the date and time the user message was sent, the sender ID, the recipient ID, the messaging system ID, and so on, and the computing device 200 for identification of suspicious users is configured to have access to the external user messages database for extracting therefrom the necessary information for further processing, the features of which are described below.

In yet other non-limiting embodiments of the present technology, the computing device 200 for identifying suspicious users may further be configured to connect directly to the messaging systems 110, 120 with direct access to their message databases 116, 126 to extract user messages therefrom for further processing, the features of which are described below.

In some non-limiting embodiments of the present technology, in response to a request for receiving user messages sent, by the computing device 200, to one of the messaging systems 110, 120, that, in response, transmits only those user messages to the computing device 200 as described above, which were saved in the message database 116 or 126, respectively, for a given period of time, for example, all recent user messages starting from the time of sending the said request by the computing device 200 or from the moment the request was received by the corresponding management server via the corresponding API-interface, or all user messages starting from user messages saved in the last few minutes, hours, days, weeks, months, etc. depending on the tasks.

Computing Device for Detection of Suspicious Users in Messaging Systems

The computing device 200 for detection of suspicious users according to this technique, depicted in FIG. 2 is configured to identify suspicious users in messaging systems 110, 120 and, according to the non-limiting embodiments of the present technology, comprises a combination of hardware and software implemented as a general-purpose computer.

In particular, a general-purpose computer usually comprises a central processor, system memory, and a system bus, which in turn comprises various system components, including memory associated with the central processor. A system bus in such a general-purpose computer comprises a memory bus and a memory bus controller, a peripheral bus and a local bus, configured with a possibility of interaction with any other bus architecture. System memory comprises read-only memory (ROM) and random access memory (RAM). The Basic Input/Output System (BIOS) comprises basic procedures that ensure the transfer of information between the elements of such a general-purpose computer, for example, at the time of loading the operating system using the ROM. In addition, a general purpose computer comprises a hard disk for reading and recording data, a magnetic disk drive for reading and recording to removable magnetic disks, and an optical drive for reading and recording on removable optical disks such as CD-ROM, DVD-ROM and other optical storage media, but other types of computer storage media can be used to store data in machine-readable form, such as solid-state drives, flash cards, digital disks, etc., and connected to the system bus via controller. At a general-purpose computer, a hard disk, a magnetic disk drive and an optical drive are connected to the system bus via a hard disk interface, a magnetic disk interface and an optical drive interface, respectively. Drives and associated computer storage media are non-volatile means of storing computer instructions, data structures, program modules and other general-purpose computer data. A general purpose computer has a file system that stores a recorded operating system, as well as additional software applications, other software modules and program data. The user can enter commands and information into a general-purpose computer using known input devices, such as a keyboard, mouse, microphone, joystick, game console, scanner, etc., wherein these input devices are usually connected to a general-purpose computer via a serial port, which is in turn connected to the system bus, but they can also be connected in some other way, for example, using a parallel port, a game port, or a universal serial USB bus. A monitor or other type of display device is also connected to the system bus via an interface, such as a video adapter. In addition to the monitor, a personal computer may be equipped with other peripheral output devices, such as speakers, a printer, etc. A general purpose computer can work in a network environment, and a network connection can be used to connect to one or more remote computers. Network connections can form a local area network (LAN) and wide area network (WAN). Such networks are usually used in corporate computer networks and internal networks of companies, wherein they have access to the Internet. In a LAN or WAN network, a general purpose computer is connected to the local network via a network adapter or network interface. When using networks, a general purpose computer may use a modem, network card, adapter or other means of providing connection with a global computer network, such as the Internet, and these means of communication are connected to the system bus via a serial port. It shall be noted that in the ROM of the general purpose computer or at least in any of the above computer-readable media that can be used in a general-purpose computer, the computer-readable instructions can be stored which can be accessed by the CPU of the general-purpose computer, wherein execution of these machine-readable instructions on a general-purpose computer may cause the central processor to execute various procedures or operations described later in this document.

In some non-limiting embodiments of the present technology, the computing device 200 may be implemented as a single computer server, such as a Dell™ PowerEdge™ server using the Ubuntu Server 18.04 operating system. In other non-limiting embodiments of the present technology, the computing device 200 may be comprise a desktop personal computer, laptop, netbook, smartphone, tablet, and any other electronic computing device suitable for implementing the non-limiting embodiments of the present technology.

In yet other non-limiting embodiments of the present technology, the computing device 200 may be implemented as any other combination of hardware, software or software and hardware complex, suitable for implementing the non-limiting embodiments of the present technology.

In some non-limiting embodiments of the present technology, the system 100 may also comprise at least two computing devices, each being similar to the computing device 200, and the functionality described below for computing device 200 can be, in any appropriate way, divided between the at least two computing devices, each of them, for example, can be configured as a separate computer server.

b. In the non-limiting embodiments of the present technology, the computing device 200 depicted in FIG. 2, has a communication module 210, an analyzing module 220 and a local data storage 230, each being connected to a communication bus 240, wherein each of the communication module 210 and the analyzing module 220 being capable of exchanging data via the communication bus 240 with the local data storage 230, and the communication module 210 is also configured to exchange data with the analyzing module 220.

In some non-limiting embodiments of the present technology, the parsers 130, 140 can each be configured as a separate preprocessing module embedded in the computing device 200 (i.e., included in this computing device 200) and having the above-described functional capabilities of one of the corresponding parsers 130, 140, in particular the functionality for providing interaction between the computing device 200 and one of the corresponding messaging systems 110, 120 through one of the corresponding API-interfaces 114, 124 (i.e., each of these separate data preprocessing modules shall be preprogrammed to work with one of the corresponding API-interfaces 114, 124), respectively; and processing output data streams from one of the corresponding API interfaces 114, 124. In these embodiments, the communication module 210 of the computing device 200 may be configured, for example, as multi-channel, with each of the communication channels being pre-configured to exchange data via the communication bus 240 with one of the above described separate modules of data pre-processing and data exchange with one of the corresponding API-interfaces 114, 124.

In other non-limiting embodiments of the present technology, the computing device 200 may comprise two communication modules, each being similar to the communication module 210, each of these communication modules being pre-configured to exchange data via communication bus 240 with one of the above described separate data processing modules and to exchange data with one of the corresponding API-interfaces 114, 124. In these embodiments, the separate data preprocessing modules (not depicted) are also configured to communicate, via the communication bus 240, with the analyzing module 220 to process the corresponding requests (described later in this document), which can be generated by the analyzing module 220, which are further transmitted, by the computing device 200, to one of the corresponding messaging systems 110, 120. It shall also be noted that when processing the output data streams from one of the corresponding API-interfaces 114, 124, each of these separate preprocessing data modules (not depicted) can, inter alia, identify or recognize the description format of the output data stream received from the corresponding API-interface, and if the identified data description format does not correspond to the unified data description format predetermined for the computing device 200, then this module of data preprocessing may further be configured to convert this received output data stream into the unified format, each of these data preprocessing modules may be further configured to communicate, via the communication bus 240, with the local data storage 230 to receive therefrom data in the unified data description format (as described below), processable by the computing device 200, and configured to compare the identified and unified data formats to determine correspondence therebetween. Thus, in the non-limiting embodiments of the present technology, if any of the above described separate data preprocessing modules determines that among the output data streams received from one of the corresponding API-interfaces 114, 124, there are, for example, voice/audio messages and/or video/video streams, then such separate data preprocessing module converts the specified voice/audio messages or video/video streams into text using at least one of the conversion methods described above, that is, to such data description format that is processable by the computing device 200. In these embodiments, the functionality of each of the preprocessing modules for converting voice/sound messages or video/video streams (not depicted) into text can be implemented in a separate conversion module embedded in the computing device 200 and configured to exchange data with one of the corresponding data preprocessing modules.

In yet other non-limiting embodiments of the present technology, the parsers 130, 140 can be implemented as a single data preprocessing module (not depicted) embedded in the computing device 200, and having the above-described functionality of both parsers 130, 140, namely, providing the functionality for interaction between the computing device 200 and the messaging systems 110, 120, respectively, through their API-interfaces 114, 124 (i.e., such a single data preprocessing module shall be preprogrammed to work with both API-interfaces 114, 124) and for processing output data streams from API-interfaces 114, 124. In these embodiments, the single data processing module (not depicted) is connected to the computing device 200 via the communication bus 240 to enable data exchange with the communication module 210, which provides communication between the API-interfaces 114, 124 and the computing device 200, wherein the communication module 210 of the computing device 200 in this case can be configured, for example, multichannel, and each of the communication channels in the communication module 210 can be pre-configured to exchange data with one of the corresponding API-interfaces 114, 124. In these embodiments, the single data preprocessing module (not depicted) is also configured to interact, via the communication bus 240, with the analyzing module 220 to process the above requests (described above in this document), which can be generated by this analyzing module 220, with their subsequent transmission from the computing device 200 to one of the messaging systems 110, 120. It shall also be noted that when processing output data streams from API-interfaces 114, 124, the single data preprocessing module (not depicted) can, inter alia, identify or recognize the description format of output data streams received from API-interfaces 114, 124, wherein, if the identified data description format does not correspond to the unified data description format processable by the computing device 200, then it may further be configured to convert these received output data streams to the unified format, wherein the single data preprocessing module can be additionally configured to communicate, via the communication bus 240, with the local data storage 230, to receive data indicative of the unified data description format (as described below), processable by the computing device 200, and with the possibility of comparing the identified and unified data formats to determine correspondence therebetween. Thus, if the single data preprocessing module determines that, in one of the output data streams received from API-interfaces 114, 124, there are, for example, voice messages or video, then the single data preprocessing module converts the voice messages or video into text, that is, in the data description format, which is processable by the computing device 200.

Local Data Storage

In the non-limiting embodiments of the present technology, the local data storage 230 is also configured to store executable program instructions that can control the operation of the communication module 210 and the analyzing module 220, as well as various data used in the operation of the computing device 200, in particular, data on the unified data description format processable by the computing device 200, data on the predetermined reputation threshold used in the computing device 200 to make a decision about classifying an analyzed user as a suspicious user, data on known malicious links, data on known malicious domain names, data on hash sums of known malicious files, data on keywords indicating malicious nature of a web resource, data on known malicious accounts of payment systems, data on known malicious email addresses and data on a second predetermined reputation threshold.

Auxiliary data used in the work of the analyzing module 220 can also be stored in the local data storage 230 comprising, for example, data on language dictionaries and a predetermined threshold value used in the method of analyzing domain names based on the correctness of their spelling; virtual machine image files and a set of rules for analyzing changes in virtual machine state parameters used in suspicious file analysis methods based on changes in virtual machine state parameters, a set of regular expressions used to extract user messages analyzed in the analyzing module 220, references, accounts of the payment systems, email addresses and accounts at financial institutions, etc.

In the computing device 200 depicted in FIG. 2, the communication module 210 is configured to receive data transmitted by the parsers 130, 140 to the computing device 200 in response to the corresponding request of the computing device 200 sent to at least one of the messaging systems 110, 120, and then storing the received data in the local data storage 230, to which that received data can be transmitted via the communication bus 240. Thus, in the local data storage 230, user messages from the messaging systems 110, 120 can be stored, in particular, the auxiliary user identification data (such as profile pictures, full name and/or nickname) extracted from their message databases 116, 126 of the messaging systems 110, 120, in particular from their user databases 118, 128, and the auxiliary identification data of each of the administrators (such as, for example, profile picture, full name and/or nickname) of messaging systems 110, 120, in particular, retrieved from their user databases 118, 128, respectively.

In some non-limiting embodiments of the present technology, the local data storage 220 of the computing device 200 may comprise one or more databases, each being configured to store at least one separate group of the above listed groups of data.

In other non-limiting embodiments of the present technology, the computing device 200 is configured to have access to at least one remote data storage (not depicted), to which the analyzing module 220 of the computing device 200 can be configured to have access using the communication module 210, to store therein at least part of the above groups of data or all these groups of data, in particular, for storing received user messages in the unified data description format.

In yet other non-limiting embodiments of the present technology, the computing device 200 may comprise at least one local data storage and at least one remote data storage (not depicted), each being configured to store at least one of the above described data groups, wherein the local data storage is connected to the analyzing module 220, via the communication bus 240, and the remote data storages is connected to the analyzing module 220 via the communication module 120. Thus, for example, the computing device 200 comprises the local data storage 220, for example, storing only received user messages in the unified data description format, and several remote data storages storing other data groups used in the operation of the computing device 200.

In some non-limiting embodiments of the present technology, at least one of the above groups of data, in particular, received user messages in the unified data description format, can be stored in a corresponding separate local data storage (not depicted) different from the local data storage 230 and connected, via the communication bus 240, to the analyzing module 220, which in turn is configured to be connected to any of these separate local data storages to extract necessary data therefrom.

In the non-limiting embodiments of the present technology, the analyzing module 220 may be implemented as a single processor, such as a general-purpose processor or a special-purpose processor (for example, processors for digital signal processing, specialized integrated circuits, etc.) and configured to execute software instructions stored in the local data storage 230 for implementation of the following functionalities of the analyzing module 220.

The local data storage 230 may be implemented, for example, as a non-transitory computer-readable medium. In some non-limiting embodiments of the present technology, the local data storage 230 may be implemented using a single non-transitory computer-readable medium (for example, a single optical storage device, a magnetic storage device, an organic storage device, a storage device on disks, or a different type of storage device), and in other non limiting embodiments of the present technology, the local data storage 230 may be implemented using two or more known non-transitory computer-readable media.

Communication Module

In the non-limiting embodiments of the present technology, the communication module 210 used in the computing device 200 depicted in FIG. 2 has a wireless connection to the parser 130 and has a wired connection to the parser 140, as described earlier in this document, with the possibility of receiving data from them.

In some non-limiting embodiments of the present technology, the communication module 210 may be connected to both parsers 130, 140 using a wire-based connection comprising, for example, but not being limited to, a coaxial cable, twisted pair, fiber optic cable or any other physical connection, for receiving data therefrom. In these embodiments, the communication module 210 may be implemented as a network adapter comprising necessary connectors for connecting necessary types of physical cables thereto depending on the types of physical connections used to provide communication with the parsers 130, 140.

In other non-limiting embodiments of the present technology, the communication module 210 may be connected to both parsers 130, 140 using a wireless connection comprising, for example, but not being limited to, a communication link based on the WiFi™ technology, a communication link based on the 3G™ technology, a communication link based on LTE™ technology, etc. In these embodiments, the communication module 210 may be implemented as a network adapter, such as a WiFi™ adapter, a 3G™ adapter, an LTE™ adapter, or another wireless communication adapter, depending on the type of wireless link used to provide communication with the parsers 130, 140.

The communication module 210 may also be a communication device, such as a transmitter, receiver, transceiver, modem, and/or network interface card for exchanging data with external devices of any type via a wired or wireless communication network, for example, using an Ethernet network connection, digital subscriber line (DSL), telephone line, coaxial cable, cellular telephone system, etc.

Analyzing Module

In the non-limiting embodiments of the present technology, the analyzing module 220 included in the computing device 200 depicted in FIG. 2, may be implemented as a single processor, such as a general-purpose processor or a special-purpose processor (for example, processors for digital signal processing, specialized integrated circuits, etc.), for example, as a central processor of the above-described general-purpose computer, in the form of which computing device 200 may be implemented.

The analyzing module 220 is configured to have access to the local data storage 230 (a separate local data storage or a remote data storage, depending on the embodiment, as described earlier in this document) or to communicate with it using the communication bus 240 to receive therefrom a plurality of user messages, the format of which corresponds to the unified data description format, processable by the computing device 200, for their further analysis, as described below.

In some non-limiting embodiments of the present technology, the analyzing module 220 may be configured to communicate, via the communication bus 240, with the communication module 210, enabling it to receive user messages therefrom, the format of which corresponds to the unified data description format processable by the computing device 200 for further analysis as described below. Thus, in these embodiments, the analyzing module 220 may receive user messages in the unified data description format directly from the communication module 210 after receiving the user messages by the communication module 210.

In the non-limiting embodiments of the present technology where the received user messages in the unified data description format are stored in a separate local storage other than the local data storage 230, or in a remote data storage, the analyzing module 220 may be configured to have access to one of the separate and the remote data storage or to communicate therewith via the communication bus 240 to retrieve the user messages therefrom for their further analysis as described below.

The analyzing module 220 is configured to analyze each of the received user messages to identify at least one suspiciousness indicator therein based on a predetermined set of message suspiciousness indicators.

In the non-limiting embodiments of the present technology, analyzing each of the received user messages by the analyzing module 220 comprises: 1) detecting, in each analyzed user message, at least one malicious link; 2) identifying at least one malicious payment system account, in each analyzed user message; 3) detecting, in each analyzed user message, at least one malicious email address; 4) detecting, in each analyzed user message, at least one malicious account in a financial institution or a payment system.

In particular, to detect the presence of a malicious link, in each analyzed user message (each malicious link having a specific recording format), of a malicious payment system accounts (the accounts also have their specific recording format), malicious email addresses (email addresses also have their specific recording format) and/or malicious accounts in a financial institution (accounts also have their own specific recording format); the analyzing module 220 uses a given set of regular expressions, allowing to extract from a given user message all of the above information, necessary for the analyzing module 220 for further detection of suspiciousness indicators of the given user message. For example, a regular expression in the form «(https?|ftp)://(-\.)?([^\s/?\.#-]+\.?)+(/[^\s]*)?$@iS» allows to extract from any user message any web address, a regular expression like «A[13][a-km-zA-HJ-NP-Z1-9]{25,34}$» allows to extract from any user message any bitcoin wallet, and a regular expression in the form «^(\S+)@([a-z0-9-]+)(\.)([a-z]{2,4})(\.?)([a-z]{0,4})+$» allows to extract from any user message any email address.

In the non-limiting embodiments of the present technology, in order to detect at least one malicious link in the given analyzed user message, the analyzing module 220 (i) extracts, by means of a corresponding regular expression from a predetermined set of regular expressions, from the given user message at least one link; gains access to the local data storage 230 (a separate local data storage or a remote data storage, depending on the embodiment, as described earlier in this document) or communicates with it using the communication bus 240 to receive therefrom hash sum data of the known malicious files, and (iii) determines, comparing character-by-character the extracted link with the known malicious references from the received hash sum data, the fact of at least partial match of the extracted link with one of the known malicious references. If the analyzing module 220 has determined that the extracted link does not at least partially match with any of the known malicious references, then it further performs at least one of the following operations: 1) analyzes the domain name of the extracted reference for maliciousness using at least one domain name analysis technique; 2) receives or downloads at least one file located at the extracted link, followed by its analysis for maliciousness using at least one file analysis technique; and/or 3) obtains the html-code of the web resource located under the extracted link, followed by its analysis for maliciousness using at least one html-code analysis technique.

In the non-limiting embodiments of the present technology, the analyzing a given domain name of any extracted malicious link, by the analyzing module 220, comprises (i) accessing or communicating with the local data storage 230 (a separate local data storage or a remote data storage, depending on the embodiment, as described earlier in this document), using the communication bus 240 to obtain data about known malicious domain names therefrom it, (ii) determining, by comparing character-by-character the given analyzed domain name with the known malicious domain names from the obtained data, if there is at least partial match of the given analyzed domain name with one of the known malicious domain names. If the analyzing module 220 has determined that the given domain name does not at least partially match with any of the known malicious domain names, then it may further be configured to apply another suspiciousness analysis technique to the given analyzed domain name, for example, a domain name analysis method based on its length (the longer the domain name is, the more suspicious it is), a method for analyzing a domain name based on its entropy (in this case, the higher the informational entropy calculated for a given domain name using the Shannon formula, the more suspicious the given domain name is), a technique for a domain name based on its meaningfulness and/or analyzing technique of the domain name based on the correctness of its spelling. As an example, when the analyzing module 220 analyzes the given domain name for maliciousness using the domain name analysis technique based on the correctness of spelling, the analyzing module 220 performs at least the following operations: (i) establishes a connection with the local data storage 230 (a separate local or a remote data storage, depending on the embodiment) for obtaining data about language dictionaries from it, (ii) extracts at least one word from each of the obtained domain names, (iii) determines the Levenshtein distance between each of the specified extracted words and the corresponding one of the words in the language dictionaries of the specified obtained data, and (iv) compares the determined Levenshtein distance with a predetermined threshold value, which, for example, can be two (2), and rendering the analyzed domain name a malicious domain name, if the determined Levenshtein distance exceeds the predetermined threshold value.

Thus, if the analyzing module 220 has determined, by at least one of the above described analysis methods, that the domain name of the analyzed extracted link belongs to malicious domain names, it means that the analyzing module 220 has detected a malicious link in the analyzed user message, which corresponds to the presence, in this analyzed user message, one of suspiciousness indicators from a predetermined set of message suspiciousness indicators, to which the analyzing module 220 has access.

In the non-limiting embodiments of the present technology, the analyzing a given file located under the extracted link, by the analyzing module 220, comprises: (i) receiving the given file located under the extracted link; (ii) calculating a hash sum for the given file; (iii) accessing the local data storage 230 (a separate local data storage or a remote data storage, depending on the embodiment, as described earlier in this document) or communicates with it using the communication bus 240 to receive hash sum data of the known malicious files; (iv) determining, by comparing the calculated hash sum of the given file with the hash sums of known malicious files from the received data, if the calculated hash sum of the given file matches one of the hash sums of the known malicious files. If the analyzing module 220 has determined that the hash sum of the given file does not match any of the hash sums of known malicious files, then it may additionally apply at least one suspicious file analysis method to the given file, for example, a suspicious file analysis method based on changes in the state parameters of virtual machines, wherein the analyzing module 220 performs at least the following operations: (i) runs each received file on at least one virtual machine characterized by a given set of state parameters, (ii) records changes in a given set of state parameters of the at least one virtual machine over a specified period of time, (iii) analyzes the resulting changes in state parameters using a specified set of analysis rules; and (iv) determines a given file to be a malicious one if the analyzed changes of state parameters are specific to malicious files.

Thus, if the analyzing module 220 has determined, through at least one of the above analysis methods, that the given file located under the analyzed extracted link refers to malicious files, it means that the analyzing module 220 has detected a malicious link in the analyzed user message, which corresponds to the presence, in this analyzed user message, a respective one of message suspiciousness indicators from the predetermined set of message suspiciousness indicators.

In the non-limiting embodiments of the present technology, the analyzing a given html-code of a web resource located under the extracted link for maliciousness, by the analyzing module 220, comprises: (i) downloading the html-code of the web page located under the extracted link; (ii) analyzing the downloaded html-code for maliciousness using at least one analysis method, for example, methods based on keywords indicating the malicious nature of the web page, depending on malicious content (corresponds to some specific malicious elements, for example, a text inviting a user to perform an action, a file of a specific format, scripts, substituted logos, etc.) identified in the loaded html-code, pre-programmed classifier can classify or identify the type of threat posed by the downloaded html-code, for example to identify whether the downloaded html-code refers to a type of 'phishing' threats. In addition, in order to analyze the downloaded html-code for maliciousness, the analyzing module 220 can also download all images and/or other files associated with the downloaded web page, for example, graphic design elements (* .JPG, * .PNG, etc.), style sheets (* .css), JS scripts, etc., based on the lists of such images and/or other files obtained by the analyzing module 220 from the extracted html-code to verify so-called screen-signatures, that is, search for similar images and analyze related websites, wherein search for the similar images may be performed, e.g., using techniques similar to image search based on a method of searching for the nearest neighbors. During the search, the analyzing module 220 determines whether, for example, the images placed on the analyzed web page correspond to the domain name and registration data of the web resource, wherein the analyzing module 220 can also additionally calculate the hash sums of all the images present on the analyzed web page, and determine whether each calculated image hash sum matches one of the hash sums of known malicious elements that can be stored, for example, in the local data storage 230. In addition, the analyzing module 220 can further check so-called resource signatures, for which it can calculate the hash sums of all previously downloaded resources of the analyzed web page, for example, images, cascading style sheets (CSS), JS files, fonts, etc., and to determine whether each calculated hash sum of the resource matches one of the hash sums of the known malicious resources that can be stored, for example, in the local data storage 230.

Thus, if the analyzing module 220 has determined, using at least one of the above methods of analysis, that the analyzed web page located under the analyzed extracted link has malicious content, it means that the analyzing module 220 has detected a malicious link in the analyzed user message that corresponds to the presence, in this analyzed user message, a respective one of the predetermined set of message suspiciousness indicators.

In the non-limiting embodiments of the present technology, in order to detect at least one malicious payment system account in the analyzed user message, the analyzing module 220 (i) extracts at least one payment system account from the analyzed user message using a corresponding regular expression from the predetermined set of regular expressions; (ii) accesses the local data storage 230 (a separate local data storage or a remote data storage, depending on the embodiment, as described earlier in this document) or communicates with it using the communication bus 240 to receive data about known malicious payment system accounts therefrom; and (iii) determines, by, for example, a character-by-character comparison of the extracted payment system account with known malicious payment system accounts from the received data, if the extracted account of the payment system matches with one of the known malicious accounts of payment systems.

Thus, if the analyzing module 220, determines that the analyzed payment system account is related to malicious payment system accounts, this fact corresponds to the presence of another respective one of the predetermined set of message suspiciousness indicators.

In the non-limiting embodiments of the present technology, in order to detect at least one malicious email address in the analyzed user message, the analyzing module 220 (i) extracts, by means of a corresponding regular expression from the set of regular expressions, from the analyzed user message at least one email address; (ii) accesses the local data storage 230 (a separate local data storage or a remote data storage, depending on the embodiment, as described earlier in this document) or communicates with it using the communication bus 240 to receive data indicative of known malicious email addresses and (iii) determines, for example, by character-by-character comparison, if the extracted email address matches with known malicious email addresses from the received data.

Thus, if the analyzing module 220 has determined that the analyzed email address refers to malicious email addresses, then this fact corresponds to the presence, in the analyzed user message, yet another respective one of the predetermined set of message suspiciousness indicators.

In the non-limiting embodiments of the present technology, the analyzing module 220 is also configured to identify the user who sent the analyzed user message in the respective messaging system. In order to identify the user having sent a given user message, the analyzing module 220 extracts from the identification data describing the given user message that is usually comprised in the header of a user message, an ID of the user having sent the given user message, for example, a login, which can be a specified email address (an e-mail), a set of numbers and/or characters (nickname), an integer (for example, "UIN" in the messenger ICQ™ messaging system or "user_id" in the Telegram™ messaging system) or any combination thereof, or the user's device's IP address, a unique user-agent user's fingerprint, the user's device's MAC address, mobile device's IMEI, or any combination of them, and retrieves the exchange system identifier message, in which the given user message has been sent, such as the IP address of the messaging server, and the extracted messaging system identifier that uniquely identifies the messaging system and is used by the user to have sent that given message, and the extracted user identifier uniquely that identifies the user in the corresponding messaging system. Thus, the analyzing module 220 can identify the user associated with the user message, for which the analyzing module 220 determined that it has at least one of the predetermined set of message suspiciousness indictors, for example, at least one of the indicators described above.

In addition, the analyzing module 220 may further be configured to record data about the identified users associated with their unique user identifiers and unique identifiers of respective messaging systems, into a separate user database, which can be part of the local data storage 230 (or in a separate local storage of user data to which the analyzing module 220 can have access or with which it can communicate using the communication bus 240, or in a remote user data store, to which the analyzing module 220 can have access or with which it can communicate using the communication module 210 connected to the analyzing module 220 via the communication bus 240, depending on the non-limiting embodiments of the present technology), wherein each such identified user has his own specific reputation score, the value of which is initially set by the analyzing module 220 to zero and further adds of suspiciousness indicators assigned to each of the users by the analyzing module 220 as a result of analyzing their messages in the plurality of messaging systems, and the data on the values of users' reputation scores are stored in a separate user database, in which they are assigned to a unique user identifier.

In the non-limiting embodiments of the present technology, the analyzing module 220 may also be configured to assign a user suspiciousness indicator to each of the identified users, based on message suspiciousness indicators of messages associated therewith, each making a respective contribution to the user suspiciousness indicator, to change a reputation score of a respective user based on the assigned user suspiciousness indicator, wherein the analyzing module 220 is configured to assign a given numerical value (for example, a score) to each of the message suspiciousness indicators based on, for example, a specific nature of the threat corresponding to that particular message suspiciousness indicator and/or the degree of its maliciousness (in particular, the nature of the threat and/or the degree of its maliciousness can be assessed by the analyzing module 220 using, for example, special pre-programmed classifier based on the results of the analysis of user messages for maliciousness), so that the numerical value (score) assigned to a specific message suspiciousness indicator determines the contribution of this message suspiciousness indicator to a respective user suspiciousness indicator. Thus, a given user suspiciousness indicator of a given user is determined, by the analyzing module 220, by summing up numerical values (grades) corresponding to respective message suspiciousness indicators detected, by the analyzing module 220, for the given user. It shall also be noted that if the analyzing module 220 has not detected any message suspiciousness indicator in the analyzed user message, then the user suspiciousness indicator assigned to the respective user associated with the analyzed user message is zero, which does not result in change of value by the analyzing module 220 of this user's reputation score originally set to zero. Otherwise, as a result of analyzing the user message associated with the user associated with that analyzed user message, a message suspiciousness indicator is assigned to a value other than zero, and the analyzing module 220 is further configured to (i) access or communicate with the local data storage 230 using the communication bus 240 (either access to a separate local user data storage or a remote user data storage or communicates with them depending on the specific non-limiting embodiments of the present technology), (ii) find in the user's database the current value of this user's reputation score based on a unique identifier associated with the user; and (iii) update this current value of the reputation score by increasing it by the assigned user suspiciousness indicator.

The analyzing module 220 may be further configured to perform the following operations, wherein it: (i) analyzes the identification data of each identified user to identify at least one user suspiciousness indicator from a predetermined set of user suspiciousness indicators; and (ii) assigns an additional user suspiciousness indicator to each of the identified users, depending on the identified user suspiciousness indicators contributing to the assigned additional user suspiciousness indicator, and (iii) changes the user's reputation score based on the assigned additional user suspiciousness indicator.

It shall be noted that, according to the non-limiting embodiment of the present technology, when identifying at least one user suspiciousness indicator for each identified user, the analyzing module 220 is configured to execute at least one of the following operations, wherein it: (i) determines whether the profile picture, full name and/or nickname of the identified user correspond to the administrative support credentials in the corresponding one of messaging systems 110, 120; (ii) identifies whether the identified user is a program that simulates a behavior of a human user in one of the messaging systems 110, 120; (iii) identifies whether the persons invited by the identified user to exchange messages within the established message exchange channel in one of the messaging systems 110, 120 are programs that simulate the behavior of a human user in the respective messaging system; and/or (iv) identifies whether there are users with the same identification data in one of the messaging systems 110, 120.

To determine correspondence between the profile picture, full name and/or nickname of the identified user and the administrator identification data, the analyzing module 220 performs the following operations, wherein it: (i); sends a request to one of the messaging systems 110, 120 based on the unique identifier of the identified user and the unique identifier of the messaging system to obtain the necessary supporting identification data of this identified user, in particular, profile picture, full name and/or nickname of the identified user, from one of the respective user databases 118, 128; (ii) sends another request to the respective messaging system, from which the necessary auxiliary identification data of the identified user was obtained, in order to obtain the necessary identification information about the administrator of the respective messaging system, in particular, the profile picture, name and/or the nickname of the administrator, from the respective user database (it shall be noted that the messaging system administrator is in fact also one of its users; however, it has a wider scope equal to other users of this messaging system, in particular, by comparison with the identified user); and (iii) determines whether the profile picture, full name and/or nickname of the identified user are comprised in the received identification data of the identified user matches the profile picture, name and/or administrator nickname comprised in the obtained identification data of the administrator; accordingly, if at least one element of identification data from the profile picture, the full name and nickname of the identified user matches at least one corresponding element of the administrator identification data, it means that the identified user, with a certain degree of probability, simulates the behavior of the administrator in the messaging system.

Thus, if the analyzing module 220 has determined that at least one of the profile picture, full name and/or nickname of the identified user matches the profile picture, full name and/or nickname of the administrator, respectively, then this fact indicates that the identified user is characterized by one of the user suspiciousness indicators from the predetermined set of message suspiciousness indicators.

In the non-limiting embodiments of the present technology, in order to determine whether the identified user is a program that simulates the behavior of a human user, the analyzing module 220 analyzes the message sending activity of the identified user in one of the messaging systems 110, 120 (in particular, in each messaging channel to which the identified user was connected within each of the messaging systems) for a specified period of time based on the unique identifier of the identified user and the unique identifier of the respective messaging system, in this case, if the analyzing module 220 detects, by means of, for example, a pre-programmed classifier embedded in the analyzing module 220, that the sending messages activity by identified user in the one of the messaging systems corresponds to one of the specified timing schemes known to the analyzing module 220, it determines the identified user as a program simulating the behavior of a human user in the respective messaging system (bot programs).

Thus, if the analyzing module 220 has determined that the identified user is a bot program, this fact also indicates that the identified user is characterized by another respective user suspiciousness indicator from the predetermined set of message suspiciousness indicators.

If the analyzing module 220 determines that the persons invited by the identified user (in particular, such invited persons are also users who use the respective one of the messaging systems to communicate with other users of this messaging system) to take part in the messaging (that is, in the process of communication between users of the system by messaging, such as, for example, chatting, writing, multiuser chat, private chat or the like) within at least one messaging channel of one of the messaging systems 110, 120, are programs that simulate the behavior of a human user, the analyzing module 220 (i) sends a request to the respective one of the messaging systems 110, 120 (this request uses the syntax of the API command of the respective messaging system)) based on the unique identifier of the identified user and the unique identifier of the messaging system to obtain therefrom the necessary data about persons invited by the identified user; (ii) for each of the invited persons who have communicated using the respective messaging system, the analyzing module 220 proceeds to perform operations identical to the above described operations performed by the analyzing module 220 to determine if the identified user is a program that simulates the behavior of a human user (see the above description).

Thus, if the analyzing module 220 has determined that at least one messaging user invited by the identified user is a bot program, this fact also indicates that the identified user is characterized by yet another user suspiciousness indicator from the predetermined set of message suspiciousness indicators.

In the non-limiting embodiments of the present technology, if it is established that there is at least one user in one of the messaging systems 110, 120 with identification data that matches the identification data of the identified user, the analyzing module 220 (i) sends requests (each request uses the syntax of the API command of one of the corresponding 110, 120 messaging systems) to the messaging systems 110, 120 based on the unique identifier of each of these messaging systems 110, 120 and a unique identifier of the identified user to identify in each of these messaging systems 110, 120 the users having the same identification data as the identified user.

Thus, if the analyzing module 220 has determined that there are users in the messaging systems 110, 120, at least one identity element of which matches the corresponding at least one identity element of the identified user, this fact also indicates that the identified user is characterized by yet another user suspiciousness indicator from the predetermined set of message suspiciousness indicators.

In the non-limiting embodiments of the present technology, the analyzing module 220 may further be configured to assign a predetermined numerical value (for example, a score) to each of the identified user suspiciousness indicators based on, for example, but not limited to, a number of elements of the identification data including a profile picture, full name and nickname of the identified user and administrator, a number of users that are the bot programs, among users of a particular messaging system, invited by the identified user, a number of identity elements, such as e-mail, that match the identified user and the users of all messaging systems, and the number of such users, etc. Thus, the numerical value (score) assigned to a specific user suspiciousness indicator determines the contribution of the specific user suspiciousness indicator to the additional user suspiciousness indicator assigned to the user. Thus, the additional user suspiciousness indicator attributed to the identified user by the analyzing module 220 is obtained by summing up the numerical values (scores) assigned to the additional user suspiciousness indicator of the user identified by the analyzing module 220 for that identified user. It shall also be noted that if the analyzing module 220 has not determined any of the above user suspiciousness indicators for the identified user, then the additional user suspiciousness indicator assigned to this particular user is zero, which does not change the reputation score value for this user. Otherwise, if the identified user has been assigned, by the analyzing module 220, an additional user suspiciousness indicator of a value other than zero, then the analyzing module 220 (i) accesses the local data storage 230 or communicates with it using the communication bus 240 (or accesses a separate local storage of user data or a remote storage of user data, or establishes communication therewith), (ii) retrieves, in one of the user database, a current value of that user's reputation score based on a unique identifier associated therewith; and (iii) updates the current value of the reputation score by increasing it by the value of the additional user suspiciousness indicator assigned to this user.

Thus, according to the non-limiting embodiments of the present technology, the value of each user's reputation score in each of the messaging systems 110, 120 is influenced not only by the user suspiciousness indicator assigned to a given user by the analyzing module 220 based on the detected message suspiciousness indicators of messages sent by the given user, but also by the additional user suspiciousness indicator assigned to the given user based on the user suspiciousness indicators, as described earlier in this document.

In some non-limiting embodiments of the present technology, the analyzing module 220 may perform the above-described analysis of user identification data only for those identified users whose reputation scores exceed a second predetermined reputation threshold that is less than the predetermined reputation threshold. Thus, if the user suspiciousness indicator of the identified user, assigned based on the results of the above analysis of the user message sent by the user in one of the messaging systems, the presence of message suspiciousness indicators led to a change in the reputation score of this user to a value that exceeds the second predetermined reputation threshold, the analyzing module 220 proceeds to perform the above described analysis of identification data of the user, wherein the analyzing module 220 obtains the set value of the predetermined reputation threshold and the set value of the second predetermined reputation threshold from the local data storage 230 (a separate local storage of data on threshold values for messaging systems or a remote storage of data on threshold values for messaging systems depending on specific non-limiting embodiments of the present technology).

In the non-limiting embodiments of the present technology, the analyzing module 220 may also be configured to classify the identified users at least in one of the messaging systems 110, 120 as suspicious users if the changed value of their reputation score exceeds the predetermined reputation threshold, retrieved from the local data storage 230 (a separate local storage of data on reputation threshold values for each of the plurality of messaging systems or a remote storage of data on reputation threshold values for each of the plurality of messaging systems).

In the non-limiting embodiments of the present technology, the analyzing module 220 may also be configured with to send information about each of the identified suspicious users to one of the corresponding messaging systems 110, 120 based on the unique identifier of the suspicious users and the unique identifier of a respective messaging system associated with the suspicious users. Upon receipt of the sent information about a suspicious identified user associated with at least the unique identifier and the unique identifier of the corresponding messaging system, the control server of that messaging system may, for example, store the received information in a separate database of suspicious users hosted by the respective messaging system, to prevent or prohibit, for example, to view any messages the suspicious users stored in one of the message database, to view any information about the suspicious users stored in one of the user databases, to send any messages to the suspicious users, and to exchange messages therewith that suspicious any of the plurality of messaging systems.

In some non-limiting embodiments of the present technology, the analyzing module 220 may be configured to send a request to block each of the identified suspicious users in a respective one of the plurality of messaging systems. Upon receipt of such a request that is made at least with the unique identifier of a suspicious user and the unique identifier of the corresponding messaging system, the control server of respective messaging system may, for example, prohibit, for example, viewing any messages of this suspicious user stored in the corresponding message database; viewing any suspicious user information stored in the respective user database, sending any messages to the suspicious user and messaging therewith in the respective messaging system.

In some non-limiting embodiments of the present technology, if the analyzing module 220 has detected a suspicious user in one of the corresponding messaging systems 110, 120, then it can save information indicative thereof and associated with its unique identifier and a unique identifier of a respective messaging system in a separate database of suspicious users, located, for example, in the local data storage 230 (a separate suspicious user data storage to which the analyzing module 220 can have access or with which it can communicate using the communication bus 240, or in a separate remote storage of suspicious user data to which the analyzing module 220 can have access or with which it can communicate using communication module 210 connected to the analyzing module 220 via the communication bus 240). Thus, in these embodiments, when receiving a user message from any of the plurality of messaging systems, in particular from any of the messaging systems 110, 120, the analyzing module 220 may first (that is, before performing the above described analysis of this user message for maliciousness) identify the user having sent the received message, on the basis of this user's unique identifier comprised in this received message, and then check whether this identified user has previously been identified as a suspicious user in any other messaging system that is part of the system 100 in order to identify suspicious users and interact with the computing device 200 to identify suspicious users, by accessing the suspicious user database described above, as a result, the analyzing module 220 may send information about the identified suspicious user to the respective messaging system (or to the plurality thereof), from which the specified user message has been received, for subsequent blocking the identified suspicious user therein (see the above description).

In other non-limiting embodiments of the present technology, the above-described database of suspicious users may be further interacted (via communication module 210 in conjunction with a respective parser or a respective preprocessing module) with all messaging systems of the plurality of messaging systems, in particular, with the messaging systems 110, 120, configured to periodically update their databases of suspicious users with new information about new suspicious users identified in any of the messaging systems of the plurality of messaging systems of the system 100.

In yet other non-limiting embodiments of the present technology, the analyzing module 220 may interact ((via communication module 210 in conjunction with a respective parser or a respective preprocessing module) with control servers of the messaging systems, in particular with the control servers 112, 122 of the messaging systems 110, 120, configured to control their operation, so that in the above case of identifying a suspicious user, the analyzing module 220 can be configured to send control instructions to a respective one of the control servers 112, 122 to perform the above blocking operation of the suspicious user in the respective one of the messaging systems 110, 120 based on the unique identifier of the respective messaging system and the unique identifier of the suspicious user.

In some non-limiting embodiments of the present technology, for at least one of the identified user messages from the messaging systems 110, 120 stored in the respective one of message databases in the local data storage 230, the analyzing module 220 can also be configured to submit a request to the respective one of the messaging systems 110, 120, the request to determine whether the at least one of the identified user messages was modified in the respective messaging system by the user, if, in response to the request, the respective messaging system determined that the user message was, indeed, modified, the analyzing module 220 receives, via the communication module 210, this modified user message from the respective messaging system for reanalyzing for message suspiciousness indicators, as described earlier above.

In other non-limiting embodiments of the present technology, the above-described request for determining whether a user message has been modified can be sent by the analyzing module 220 to a respective one of the messaging systems 110, 120 only for those user messages, for which the analyzing module 220 has determined that each of the users, who sent these user messages, have a reputation score exceeding the second predetermined reputation threshold, wherein the information about the value of the second predetermined reputation threshold is received by the analyzing module 220 from the local data storage 230, and information about the current value of the user reputation score is received by the analyzing module 220 from the user database located in the local data storage 230, based on at least unique user identifiers associated with those users.

In some non-limiting embodiments of the present technology, for at least one of the identified user messages from messaging systems 110, 120 stored in the respective message database in the local data storage 230, the analyzing module 220 can also be configured to have access to one of the messaging systems 110, 120 based on at least unique messaging system identifier for retrieving, from one of user message databases 116, 126, a user message, the attributes of which match the attributes of the specified stored user message, and configured to calculate hash sums of the specified stored user message and the retrieved user message, wherein in case of mismatch of the calculated hash sums, the analyzing module 220 repeatedly performs the above analysis of maliciousness with respect to the specified modified user message.

According to other non-limiting embodiments of the present technology, accessing to one of the respective message databases 116, 126 of messaging systems 110, 120, and then extracting the necessary user message therefrom (as described above) can be performed by the analyzing module 220 only for those user messages for which the analyzing module 220 has determined that the users who sent these user messages have reputation scores exceeding the second predetermined reputation threshold, while the analyzing module 220 receives information about the second predetermined reputation threshold from the local data storage 230, and information about the current value of the user reputation score, the analyzing module 220 receives from the user database located in the local data storage 230 based on at least one unique user identifier.

In order to identify, in the messaging systems, at least one user associated with a suspicious user message (i.e., associated with an analyzed user message, in which the analyzing module 220 has detected at least one message suspiciousness indicator as described above), in the messaging systems of the system 100 in order to identify suspicious users and interacting with the computing device 200 in order to identify suspicious users, for example, in messaging systems 110, 120, the analyzing module 220 (i) receives from each of the messaging systems 110, 120 all user messages stored respectively in the message databases 116, 126, each received user message being associated with a unique identifier of a respective messaging system and unique identifier of a specific user; (ii) compares a suspicious user message with each of the received user messages using at least one known method for comparing text data, for example, by character-by-character comparison, comparison by keywords that can be extracted from each user message using, for example, a special pre-programmed classifier embedded in the analyzing module 220, and/or by comparing the hash sums calculated by the analyzer module 220 for each suspicious user message, with the hash sum calculated by the analyzing module 220 for each of the received user messages, to detect messages similar to the a given suspicious user message in these messaging systems 110, 120, ensuring that users who send such similar messages are grouped into a user cluster; (iii) such that, if a reputation score of at least one of the users in the user cluster exceeds the predetermined reputation threshold (as described in more detail above), all users from the user cluster are classified as suspicious users. It shall be noted that, in the non-limiting embodiments of the present technology, in order to obtain the necessary user messages, the analyzing module 220 can either send a corresponding request to each of the messaging systems 110, 120 to receive the necessary user messages, or directly access each of the message databases 116, 126 or establish a connection with them to extract the necessary user messages therefrom.

Further, for identifying in the messaging systems at least one user associated with a suspicious user message (i.e. associated with the analyzed user message in which the analyzing module 220 has detected at least one message suspiciousness indicator as described above), in the messaging systems 110, 120, the analyzing module 220 (i) receives from each of the messaging systems 110, 120 all user information stored respectively in the user databases 118, 128 associated with each of the users based on unique identifiers of the respective messaging system and unique identifier of a user; (ii) compares the identification data of the suspicious user, in particular its unique identifier, with the corresponding identification data of each user (in particular, with his unique identifier having the same type of possible types of user identifiers described above as that of the suspicious user), which is comprised in the obtained information about the users, in order to identify in these messaging systems 110, 120 the users with the similar identification data; (iii) responsive to the users with similar identification data being identified in the messaging systems 110, 120, clustering those users into a user cluster; (iv) responsive to a reputation score of at least one of the users in the user cluster exceeding the predetermined reputation threshold, classifying all users in the user cluster as suspicious users. It shall be noted that the analyzing module 220 can either send a corresponding request to each of the messaging systems 110, 120 and obtain all necessary information about users in response to this request, or directly access each of the user databases 118, 128 or connect with them and extract therefrom all the necessary information about users.

Further, for identifying in the messaging systems at least one user associated with a suspicious user message (i.e. associated with the analyzed user message in which the analyzing module 220 has detected at least one message suspiciousness indicator as described above), in the messaging systems 110, 120, the analyzing module 220 (i) receives from each of the messaging systems 110, 120 all user messages stored, respectively, in the message databases 116, 126, and associated with each received user message corresponding to with a unique identifier for a particular messaging system and a unique identifier for a specific user; (ii) extracts, by means of a corresponding regular expression from the predetermined set of regular expressions, from this received user message at least one link; (iii) determines if the at least one extracted link matches with any other link received form the user messages of the respective on of the messaging systems 110, 120; (iv) responsive to at least one link from the user messages being the same as the at least one extracted link form the suspicious user message, clustering, in a user cluster, all users having sent the at least one extracted link; (v) responsive to a reputation score of at least one user in the user cluster exceeds the specified predetermined reputation threshold (as described in more detail earlier in this document), all users from the user cluster are classified as suspicious users. It shall be noted that the analyzing module 220 can either send a corresponding request to each of the messaging systems 110, 120 and receive all necessary user messages in response thereto, or directly access each of the user databases 118, 128 or to contact them and to extract all necessary user messages therefrom.

In order to determine if the at least one extracted link is the same, in the messaging systems 110, 120, the analyzing module 220 performs at least one of the following operations (i.e. to identify a network resource parameter common to two or more network resources), for each pair including the at least one extracted link and each one of the links received from user messages from the respective messaging system: (1) whether the domain names have a similar spelling (for example, by comparing them character-by-character, calculating the Levenshtein distance between the domain names, comparing their hash sums calculated by the analyzing module 220, and/or other suitable methods); (2) whether the domain names are registered to a same person; (3) whether same personal data are indicated for the domain names, in particular, phone number, actual address and/or email address; (4) whether the domain names are located at the same IP address; and (5) whether the extracted links have the same single web resource pointer "URL" (for example, by their character-by-character comparison, calculating the Levenshtein distance between these "URLs", comparing their hash-sums calculated by the analyzing module 220, and/or any other suitable method), with information about the persons to which domain names are registered, information about personal data (included in the registration data of the domain name) specified for registered domain names, and IP addresses where registered domain names are located, could be automatically received by the analyzing module 220 using, for example, the online service "Whois", in particular by automatically sending a suitable search query to this online service "Whois" and extracting the necessary information from the response of the online service "Whois" or from the web pages with the results of the search query by using, for example, a special parser embedded in the analyzing module 220 and analyzing, for example, the text of the response of the online service "Whois" or the html-code of the named web page.

According to some non-limiting embodiments of the present technology, the determining if the at least one extracted link is the same, in the messaging systems 110, 120 can also be performed by the analyzing module 220 by comparing, for each pair of compared links, the history of changes in IP addresses, running services, and the history of domain names, DNS server history, DNS record change history, SSL keys, SSH fingerprints, executable files, and other parameters of network resources. It shall be noted that the above-referenced determination can be performed by the analyzing module 220 based on a match of at least one of the above parameters of network resources. For example, but without being limited to, the relationship between network resources located under the analyzed pair of links can be established by the analyzing module 220 by creating a mathematical model in a form of a graph, wherein the vertices of the created graph correspond to a first network resource and a second network resource, and the graph edges are connections between the first network resource and the second network resource based on at least one parameter of the above-referenced parameters common to both the first network resource and the second network resource. In these embodiments, the analyzing module 220 may be configured to assign, for example, using a machine learning algorithm, weights to the first network resource and the second network resource based on the parameter common between the first network resource and the second network resource, wherein the number of connections for a given network resource parameter between each one of the first network resource and the second network resources can be limited by a threshold value. The analyzing module 220 is additionally configured to determine (i) a link coefficient as a ratio of a number of links based on the network resource parameter common between each one of the first network resource and the second network resources; and (ii) the weights of each link based on the network resource parameter common between the first network resource and second network resources; and (iii) the analyzing module 220 is further configured to delete links between the first network resource and the second network resource if a value of the determined link coefficient is lower than a predetermined threshold value.

It shall be noted that, according to the non-limiting embodiments of the present technology, in the above description in respect of clustering users, the analyzing module 220 stores information about clustered users in a separate database of clustered suspicious users stored in the local data storage 230, or in the corresponding subsection of the user database for storing information about clustered suspicious users being part of the local data storage 230 (a separate local data storage of associated suspicious users to which the analyzing module 220 is configured to have access or with which it can communicate using the communication bus 240, or in a separate remote storage of suspicious users, to which the analyzing module 220 is configured to have or with which it can communicate using the communication module 210, connected to the analyzing module 220 via the communication bus 240) as described above, the analyzing module 220 additionally checks whether this suspicious user belongs to a user cluster by searching for that suspicious user among suspicious users in a separate database of user clusters or a subsection of the user database for storing information about user clusters in the local data storage 230 based on the unique identifier of this suspicious user.

In some non-limiting embodiments of the present technology, the analyzing module 220 may cluster users in a user cluster based on similar messages (as described in more detail above), based on similar identification data (as described in more detail above), and user cluster, based on same links (as described in more detail above) into a general user cluster, followed by its use by the analyzing module 220 in the manner described above.

In some non-limiting embodiments of the present technology, users and/or user cluster may be blocked by one of the above methods for a predetermined period of time, including removing at least part of the messages sent by each one of the blocked users and/or each of the blocked users of one user cluster in one of the messaging systems, for example, only user messages with malicious content, or all of them. In these embodiments, if a previously blocked user is unblocked (for example, if a user passes a given unblocking procedure and satisfies all of predetermined conditions), the corresponding messaging system sends, to the computing device 200, information about the unblocked user, associated with a unique identifier and the unique identifier of the respective one of the plurality of messaging systems, the analyzing module 220 automatically (by default) sets for such an unblocked user an indicator of his reputation at a specified initial value, different from zero and less than the value of the specified second predetermined reputation threshold.

FIG. 3 depicts a flowchart diagram of a method 300 for identifying suspicious users in messaging systems, according to the non-limiting embodiments of the present technology. It shall be noted that the method 300 may be performed using a computing processor of any computing device, in particular, the analyzing module 220 of the computing device 200 in FIG. 2.

The method 300 depicted in FIG. 3 begins with step 310, wherein a plurality of user messages from the plurality of messaging systems is received by the computing device 200.

In some non-limiting embodiments of the present technology, the step 310 may include an additional operation, wherein a description format of the received plurality of user messages is identified, if the identified message description format does not match a predetermined data description format processable by the computing device 200, then the received messages will be converted into the predetermined data format.

In other non-limiting embodiments of the present technology, the step 310 may include an additional operation, wherein voice messages and videos are detected in the received plurality of user messages and converted into text.

Further, method 300 proceeds to step 320, wherein each of the user messages received at stage 310 is analyzed to identify at least one message suspiciousness indicator from the predetermined set of message suspiciousness indicators.

In some non-limiting embodiments of the present technology, the step 320 may include at least one of the following sub-steps: (1) detecting in a given analyzed user message at least one malicious link; (2) detecting at least one malicious payment system account; (3) identifying at least one malicious email address; (4) detecting an indication of at least one malicious account in a financial institution.

It shall be noted that the above described detection substep of detecting, in the given analyzed user message, at least one malicious link may include extracting the at least one link from the given analyzed message by executing at least one of the following operations: (i) analyzing domain name of the extracted link for maliciousness using at least one analysis technique; (ii) receiving at least one file located under the extracted link, followed by its analysis for maliciousness using at least one analysis technique; and (iii) obtaining html-code of the web resource located under the extracted link, followed by its analysis for maliciousness using at least one analysis technique. In addition, the substep of detecting, in the analyzed user message, at least one malicious link may further include performing an operation that determines whether the extracted link matches one of the known malicious references. In addition, operation (i) of the substep of detecting at least one malicious link in the given analyzed user message may additionally include checking whether the analyzed domain name at least partially matches with one of the known malicious domain names. In addition, operation (ii) of the above substep of detecting at least one malicious link in the given analyzed user message may additionally include calculating the hash sum of the a file located under the extracted link, and determining whether the calculated hash sum of the analyzed file matches one of the hash sums of one of the known malicious files. In addition, operation (iii) of the above described substep of detection in the analyzed user message of at least one malicious link may additionally include a search in the received html-code of the web resource of a given keywords indicating the malicious nature of the web resource.

In other non-limiting embodiments of the present technology, the above described step of detecting at least one malicious payment system account, in the given analyzed user message may include extracting at least one payment system account from the given analyzed user message, with verification whether the extracted payment system account matches with one of the known malicious payment system accounts.

In some non-limiting embodiments of the present technology, the above described step of detecting at least one malicious email address in the given analyzed user message may include extracting at least one email address from the given analyzed user message with the verification whether the extracted email address matches one of the known malicious email addresses.

According to the non-limiting embodiments of the present technology, the method 300 may additionally include the step of further analyzing the identification data of the identified users to identify at least one user suspiciousness indicators from a predetermined set of user suspiciousness indicators, such that an additional user suspiciousness indicator is assigned to each of the identified users, depending on the detected message suspiciousness indicators, each making its contribution to the assigned additional user suspiciousness indicator, thereby changing a predetermined user's reputation score based on the assigned user suspiciousness indicators.

According to some non-limiting embodiments of the present technology, the above described additional step of analyzing the identification data of identified users can be performed with respect to only those identified users whose reputation exceeds the second predetermined reputation threshold that is lower than the predetermined reputation threshold.

According to other non-limiting embodiments of the present technology, to identify at least one user suspiciousness indicator of each of the identified users when performing the above-described additional step of analyzing the identification data at least one of the following operations may be performed: (1) determining whether at least one of the profile picture, full name and/or nickname of the identified user matches the corresponding administrator information in at least one of the messaging systems of the plurality of messaging systems; (2) determining if the identified user is a program that simulates the behavior of a human user in any one of the plurality of messaging systems; (3) determining whether the persons invited by the identified user to exchange messages within the framework of at least one message exchange channel in one of the plurality of messaging systems are programs simulating the behavior of a human user; (4) determining whether at least one user in one of the plurality of the messaging systems has identification data that matches the identification data of the identified user.

According to some non-limiting embodiments of the present technology, when performing the above operation (2), the activity of sending messages by an identified user in one of the plurality of messaging systems is analyzed for a specified period of time, and if it is determined that the activity of sending messages by the user corresponds to a predetermined timing scheme, the identified user is classified as a program that simulates the behavior of a human user.

According to other non-limiting embodiments of the present technology, the user messages analyzed in step 320 are stored in a respective one of the message databases run by the computing device 200. In these embodiments, at least one of the user messages stored in the respective message database run by the computing device 200 is sent to one of the corresponding messaging systems 110, 120 associated with the stored user message to determine the fact of the change of this user message by the user himself in the specified messaging system, wherein in case of determining the fact of change of the user message, the modified user message is received from the respective messaging system, to reanalyze for message suspiciousness indicators, as described above. To that end, a request for ascertaining whether the user himself has changed this user message can be sent to the respective messaging system at least for one saved user message associated with the user whose reputation has exceeded the second predetermined reputation threshold. Alternatively, at least one of the stored user messages is accessed, by the computing device 200, from the corresponding messaging system to retrieve from the respective message database, the attributes of which match the attributes of the stored user message, and the hash sums of the specified stored user message and the extracted user message are calculated, wherein in the event of mismatch between the calculated hash sums, the specified modified user message is reanalyzed for message suspiciousness indicators. To that end, accessing the message database of the respective messaging system with extracting the necessary user message therefrom can be performed for at least one saved user message associated with a user whose reputation score has exceeded the second predetermined reputation threshold.

The method 300 then proceeds to step 330, wherein, if at least one message suspiciousness indicator is detected in the given analyzed user message, at least one user associated with the given analyzed user message is identified in the specified messaging systems; and the method 300 proceeds then to step 340, whereby each of the identified users is assigned a user suspiciousness indicator depending on the identified message suspiciousness indicators, each making its own contribution to the user suspiciousness indicator, thereby changing the user's reputation score, and at step 350, wherein users in at least one of the plurality of messaging systems are considered suspicious users if the changed value of their reputation score exceeds the predetermined reputation threshold.

In some non-limiting embodiments of the present technology, the identifying at least one user associated with a given suspicious user message, in one of the plurality of messaging systems, at step 330, messages that are similar to the given suspicious user message are detected in the one of the plurality of messaging systems, thereby clustering the users who have sent such similar messages into a user cluster, and if the reputation score of at least one of the users of the user cluster, at step 340, exceeds the predetermined reputation threshold, then at step 350, all users from the user cluster are classified as suspicious users.

In other non-limiting embodiments of the present technology, the identifying at least one user associated with the given suspicious user message, in one of the plurality of messaging systems, at step 330, further comprises, in these messaging systems, identifying users with similar identification data, thereby clustering them into user cluster, such that, if a reputation score of at least one of the users in the user cluster, determined at step 340, exceeds the predetermined reputation threshold, then at step 350, all users from the user cluster are referred to as suspicious users.

In yet other non-limiting embodiments of the present technology, the identifying at least one user associated with the given suspicious user message in one of the plurality of messaging systems at step 330, further comprises determining if the link extracted from the given analyzed messages in the messaging systems and at least one of other links extracted from the messages analyzed in these messaging systems are the same, thereby clustering users having sent the extracted link as part of their messages into a user cluster, wherein if a reputation score of at least one of the users of the user cluster, obtained at step 340, exceeds the predetermined reputation threshold, then at step 350, all users of the user cluster are referred to as suspicious users. To that end, the instantly referenced determination may further comprise, for each pair of links including each of the at least one extracted link and each one of the malicious links: (1) whether the domain names have a similar spelling; (2) whether the domain names are registered to the same person; (3) whether the same contact information is provided for registered domain names; (4) whether the domain names are located at the same IP address; and (5) whether the extracted links have the same "URL".

In yet other non-limiting embodiments of the present technology, the method 300 may include an additional step of sending information about each of the suspicious users to the respective one of the plurality of messaging systems.

In some non-limiting embodiments of the present technology, the method 300 may include the additional step of sending, to a respective one of the plurality of messaging systems, a request to block each of the suspicious users.

In other non-limiting embodiments of the present technology, the method 300 may include an additional step, wherein, by means of the computing device, suspicious users are detected in the corresponding messaging systems.

The presented illustrative embodiments, examples and description are merely designed to provided merely as an aid in understanding of the proposed technical solution non-limiting embodiments of the present technology and are not intended to be restrictive limited in any way. Other possible embodiments will be clear to the specialist from the above description to persons skilled in the art. The scope of this technique is limited only by the attached claims.

The invention claimed is:

1. A method for detecting suspicious users in a plurality of messaging systems, the method executable by a computing device, the method comprising:
receiving, by the computing device, a plurality of user messages from the plurality of messaging systems,
analyzing, by the computing device, each of the plurality of user messages to identify at least one message suspiciousness indicator from a pre-determined set of message suspiciousness indicators,
in response to the analyzing rendering a positive result, identifying the given user message of the plurality of user messages as being associated with a respective message suspiciousness indicator;
identifying, by the computing device, at least one user associated with the given user message in one or more of the plurality of messaging systems, the identifying comprising extracting a link from the given user message associated with the at least one user;
creating a user cluster including users having sent the link as part of their user messages; and in response to any one of the users of the user cluster being classified as a suspicious user, classifying all the users of the user cluster as suspicious users;
assigning each one of the at least one user a user suspiciousness indicator based on:
at least one associated message suspiciousness indicator, each of the at least one message suspiciousness indicator contributing to the user suspiciousness indicator to change a reputation score of the at least one user based on the user suspiciousness indicator associated therewith,
classifying the at least one user and all the user of the user cluster, in the one or more of the plurality of messaging systems, as suspicious users in response to the reputation score of the at least one user exceeding a predetermined reputation threshold.

2. The method of claim 1, wherein the method further comprises identifying a format of the plurality of user messages, and in response to the format of the given one of the plurality of user messages not matching a pre-determined data format suitable for the computing device, converting the given one of the plurality of user messages into the pre-determined data format.

3. The method of claim 1, wherein the method further comprises: (i) detecting at least one of a voice message and a video message in the plurality of user messages, and (ii) converting the at least one of the voice message and the video message into text.

4. The method of claim 1, wherein the analyzing the plurality of user messages comprises executing at least one of:
detecting an indication of at least one malicious link,
detecting an indication of at least one malicious payment system account,
detecting an indication of at least one malicious email address, and
detecting an indication of at least one malicious account of a financial institution.

5. The method of claim 4, wherein the detecting the indication of the at least one malicious link comprises extracting at least one network address from the given user message and:
analyzing a domain name of the at least one network address for maliciousness using at least one analysis technique,
obtaining at least one file located at the at least one network address and analyzing the at least one file for maliciousness using at least one analysis technique, and
receiving html-code of a web resource located at the at least one network address and analyzing the html-code for maliciousness using at least one analysis technique.

6. The method of claim 5, further comprising determining whether the at least one network address matches, at least partially, with one of known malicious links.

7. The method of claim 5, wherein the analyzing the domain name for maliciousness comprises determining whether the domain name matches, at least partially, with one of known malicious domain names.

8. The method of claim 5, wherein the analyzing the at least one obtained file comprises determining a hash sum and determining if the hash sum matches with the hash sum of one of known malicious files.

9. The method of claim 5, wherein the analyzing the html-code comprises executing a search in the html-code for pre-determined keywords indicating malicious nature of the web resource.

10. The method of claim 4, wherein the detecting the indication of the at least one malicious payment system account comprises extracting at least one payment system account from the given user message and determining if the payment system account matches with one of known malicious payment system accounts.

11. The method of claim 4, wherein the detecting at least one malicious email address comprises extracting at least one email address from the given user message and determining if the email address matches with one of known malicious email addresses.

12. The method of claim 1, wherein the method further comprises analyzing identification data of the at least one user in order to identify at least one user suspiciousness indicator from a pre-determined set of user suspiciousness indicators, such that an additional user suspiciousness indicator assigned to each of the at least one user, based on message suspiciousness indicators of messages having been sent by the at least one user.

13. The method of claim 12, wherein the analyzing the identification data of the at least one user is executed for only those ones of the at least one user that are associated with a reputation score that exceeds a second predetermined reputation threshold, which is lower than the predetermined reputation threshold.

14. The method of claim 12, wherein the analyzing the identification data of the at least one user comprises:
determining whether at least one of: a profile picture, a full name and a nickname of the at least one user matches a corresponding one of an administrator in at least one of the plurality of messaging systems,
determining whether the at least one user is a program that simulates a behavior of a human user in the plurality of messaging systems,
determining whether an other at least one user invited by the at least one user to exchange messages within at least one message exchange channel of the plurality of messaging systems is a program that simulates the behavior of a human user, and determining whether there is an other at least one user in the plurality of messaging systems with identification data that matches the identification data of the at least one user.

15. The method of claim 14, wherein the identifying whether the at least one user is the program that simulates the behavior of a human user comprises analyzing sending messages activity of the at least one user for a pre-determined period of time, and in response to determining that the sending messages activity corresponds to a pre-determined timing scheme, classifying the at least one user as the program that simulates the behavior of a human user.

16. The method of claim 1, wherein the identifying the at least one user further comprises analyzing messages that are similar to a suspicious user message of the at least one user, such that to cluster, into a user cluster, all users having sent messages, similar to the suspicious user message; and in response to any one of the users of the user cluster being classified as a suspicious user, classifying all the users of the user cluster as suspicious users.

17. The method of claim 1, wherein the identifying the at least one user further comprises analyzing users that have similar identification data, such that to cluster, into a user cluster, all users with similar identification data; and in response to any one of the users of the cluster being classified as a suspicious user, classifying all the users of the user cluster as suspicious users.

18. The method of claim 1, wherein the method further comprises determining whether the link is the same based on at least one of:
  whether domain names have a similar spelling;
  whether domain names are registered to a same person,
  whether same personal data is specified for registered domain names;
  whether domain names are located at a same IP address; and
  whether the links have a same United Resource Locator (URL).

19. A computing device for detecting suspicious users in a plurality of messaging systems, configured to communicate with messaging systems, the computing device comprising:

a non-transitory memory for storing machine-readable instructions;
a computing processor, which, when executing the machine-readable instructions, is configured to:
  receive a plurality of user messages from the plurality of messaging systems;
  analyze each of the plurality of user messages to identify at least one message suspiciousness indicator from a pre-determined set of message suspiciousness indicators;
  in response to analyzing rendering a positive result, identify the given user message of the plurality of user messages as being associated with a respective message suspiciousness indicator;
  identify at least one user associated with the given user message in one or more of the plurality of messaging systems, the identifying comprising extracting a link from the given user message associated with the at least one user;
  create a user cluster including users having sent the link as part of their user messages; and in response to any one of the users of the user cluster being classified as a suspicious user, classifying all the users of the user cluster as suspicious users;
  assign each one of the at least one user a user suspiciousness indicator based on:
    at least one associated message suspiciousness indicator, each of the at least one message suspiciousness indicator contributing to the user suspiciousness indicator to change a reputation score of the at least one user based on the user suspiciousness indicator associated therewith,
  classify the at least one user and all the user of the user cluster, in the one or more of the plurality of messaging systems, as suspicious users in response to the reputation score of the at least one user exceeding a predetermined reputation threshold.

* * * * *